United States Patent
Feng et al.

(10) Patent No.: US 9,396,572 B2
(45) Date of Patent: Jul. 19, 2016

(54) IMAGE CORRELATION METHOD AND ELECTRONIC DEVICE THEREOF

(71) Applicant: Samsung Electronics Co., Ltd., Gyeonggi-do (KR)

(72) Inventors: Chenhua Feng, Beijing (CN); Fan Yang, Beijing (CN); Zipeng Zhao, Beijing (CN)

(73) Assignee: Samsung Electronics Co., Ltd (KR)

( * ) Notice: Subject to any disclaimer, the term of this patent is extended or adjusted under 35 U.S.C. 154(b) by 130 days.

(21) Appl. No.: 14/299,347

(22) Filed: Jun. 9, 2014

(65) Prior Publication Data

US 2014/0363098 A1    Dec. 11, 2014

(30) Foreign Application Priority Data

Jun. 9, 2013   (CN) .......................... 2013 1 0232011

(51) Int. Cl.
| | |
|---|---|
| *G06K 9/36* | (2006.01) |
| *G06T 11/60* | (2006.01) |
| *G06K 9/62* | (2006.01) |
| *G06K 9/00* | (2006.01) |

(52) U.S. Cl.
CPC ............ *G06T 11/60* (2013.01); *G06K 9/00671* (2013.01); *G06K 9/00677* (2013.01); *G06K 9/6289* (2013.01); *G06T 2207/20221* (2013.01)

(58) Field of Classification Search
None
See application file for complete search history.

(56) References Cited

U.S. PATENT DOCUMENTS

| | | | |
|---|---|---|---|
| 2007/0009178 A1* | 1/2007 | Kim et al. ...................... | 382/276 |
| 2010/0121852 A1* | 5/2010 | Kim ............................... | 707/737 |
| 2012/0051646 A1* | 3/2012 | Suzuki et al. .................. | 382/190 |
| 2012/0117069 A1* | 5/2012 | Kawanishi et al. ............ | 707/740 |
| 2013/0145260 A1* | 6/2013 | Munekuni ...................... | 715/255 |

* cited by examiner

*Primary Examiner* — Andrew Moyer
(74) *Attorney, Agent, or Firm* — The Farrell Law Firm, P.C.

(57) ABSTRACT

Provided is an image correlation method, including establishing and saving correlation relationship for a plurality of image class files to form a correlation image group, displaying image class files of the formed correlation image group on a same page in a combined manner according to the correlation relationship, receiving, in the combined display state, a user's operation instruction for any one image class file of the correlation image group, and separately performing a corresponding operation on the any one image class file according to the operation instruction.

20 Claims, 24 Drawing Sheets

RESTORE
HIDDEN IMAGES

IMAGE CORRELATION METHOD AND ELECTRONIC DEVICE THEREOF

PRIORITY

This application claims priority under 35 U.S.C. §119(a) to a Chinese Patent Application filed in the State Intellectual Property Office on Jun. 9, 2013 and assigned Serial No. CN201310232011.8, the contents of which are incorporated herein by reference.

BACKGROUND OF THE INVENTION

1. Field of the Invention

The present invention relates generally to terminal technology, and more particularly, to an image correlation method and electronic device thereof.

2. Description of the Related Art

In an existing image management and display mode, each image, as a separate file, is managed, displayed and shared. For two or more images that have some correlation, when a user needs to browse and use these images, the user needs to perform search, view and corresponding operations on each image, respectively, and share each image, respectively. This mode prevents the user from establishing a relationship between images having correlation. In the conventional art, the management and display of images is inefficient, and the user needs to perform repeated operations. When the images are shared to a network peer for saving the images, the images are saved step by step, which is cumbersome and detrimentally affects the experience.

SUMMARY OF THE INVENTION

The present invention has been made to address at least the above-mentioned problems and/or disadvantages and to provide at least the advantages described below. Accordingly, an aspect of the present invention is to provide an image correlation method, which can improve efficiency of image management and display.

According to an aspect of the present invention, an image correlation method includes establishing and saving a correlation relationship for a plurality of image class files to form a correlation image group, displaying combined image class files of the formed correlation image group on a same page according to the correlation relationship, and receiving, in the combined display state, a user's operation instruction for any one image class file of the correlation image group, and separately performing a corresponding operation on the any one image class file according to the operation instruction, wherein the image class file includes at least one of an image and a correlation image group, and wherein the correlation relationship is used to record file information and display position information of each image class file of the correlation image group.

According to another aspect of the present invention, an electronic device includes a display, and at least one processor operatively coupled to the display, the processor configured to perform operations comprising establishing and saving a correlation relationship for a plurality of image class files to form a correlation image group, displaying image class files of the formed correlation image group on a same page according to the correlation relationship, receiving, in the combined display state, a user's operation instruction for any one image class file of the correlation image group, and separately performing a corresponding operation on the any one image class file according to the operation instruction.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF EMBODIMENTS OF THE PRESENT INVENTION

Figure 1A:
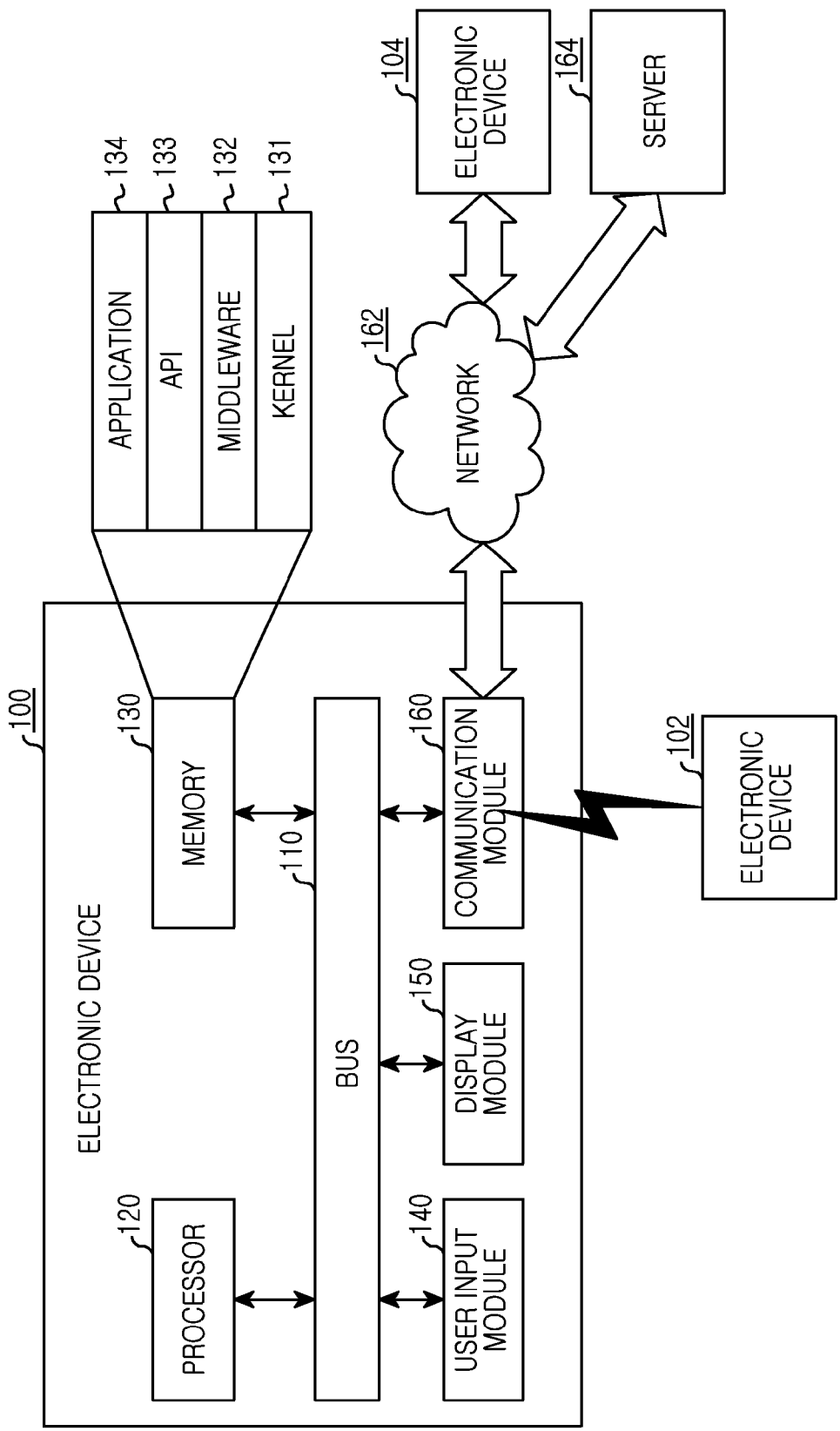
FIG. 1A illustrates a configuration of an electronic device according to an embodiment of the present invention.

Hereinafter, various embodiments of the present invention will be described with reference to the accompanying drawings. Like reference numerals or symbols refer to like elements or components that substantially perform the same function throughout. Detailed descriptions of well-known functions and structures incorporated herein may be omitted to avoid obscuring the subject matter of the present invention.

Although terms like "first" and "second" may be used to describe various components, the components are not limited to these terms, which are used only to distinguish one component from other components. For example, a first component may be referred to as a second component and vice versa without being departing from the scope of the present invention. As used herein, the term and/or includes any and all combinations of one or more of the associated listed items.

The term "application" refers to software executable on a computer Operating System (OS) or a mobile OS by a user directly. Examples of such applications include a word processor application, spread sheet application, Social Network System (SNS) application, chatting application, map application, music player application, and video player application.

A "magnetic substance" refers to a material having magnetism, for example, a material magnetized in a magnetic field. The magnetic substance includes a ferromagnetic substance, a paramagnetic substance, a diamagnetic substance, or a ferromagnetic substance. The magnetic substance may be included in a speaker, a motor, a hard disk drive, Magnetic Resonance Imaging (MRI), a cover including magnetic substance to couple to a portable device, or a portable device. A portable device 100 according to an embodiment of the present invention includes one or more magnetic substances.

A widget refers to a mini application of a Graphic User Interface (GUI) for smoothly supporting an interaction between a user and an application or OS. For example, widgets include a weather widget, a calculator widget, and a clock widget. The widget may be installed in a shortcut icon form to a desktop, a portable device, a blog, an Internet café, or a personal homepage, and may be used to directly execute a corresponding service by a click instead of a web browser. Additionally, the widget includes a shortcut icon for a designated path or a shortcut icon for executing a designated application.

Terms used in this specification are used for describing specific embodiments, and are not intended to limit the scope of the present invention. The terms of a singular form include plural forms unless referred to in the contrary. For example, a user may be a user of a portable device or a user of an external device. A user may be one or two users. The meaning of "include," "comprise," "including," or "comprising," specifies a property, a region, a fixed number, a step, a process, an element and/or a component but does not exclude other properties, regions, fixed numbers, steps, processes, elements and/or components. Like reference numerals refer to like elements throughout.

An electronic device according to various embodiments of the present invention may be one or combination of one or more of various devices which include a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Moving Picture Experts Group (MPEG) layer 3 (MP3) player, a mobile medical device, an electronic bracelet, an electronic necklace, electronic accessories, a camera, a wearable device, an electronic watch, a wristwatch, smart home appliances (e.g., a refrigerator, an air conditioner, a cleaner, a cybot, a TeleVision (TV), a Digital Versatile Disc (DVD) player, an audio, an oven, a microwave oven, a washing machine, an air cleaner, and an electronic picture frame), various medical devices (e.g., a Magnetic Resonance Artery (MRA), a Magnetic Resonance Imaging (MRI), a CT (Computed Tomography), an imaging apparatus, and a ultrasonic machine), a navigation device, a Global Positioning System (GPS) receiver, an Event Data Recorder (EDR), a Flight Data Recorder (FDR), a set-top box, a TV box (e.g., Samsung HomeSync™, Apple TV™, or Google TV™), an electronic dictionary, a car infotainment device, electronic equipment for ship (e.g., a navigation device for ship and a gyrocompass), an air electronic device, a security device, electronic clothes, an electronic key, a camcorder, a game console, a Head Mounted Display (HMD), a flat panel display, an electronic album, a part of furniture or a building/structure including a communication function, an electronic board, an electronic signature input device, or a projector. It is obvious to a person skilled in the art that the electronic device according to various embodiments of the present invention is not limited to the above-described devices.

FIG. 1A illustrates a configuration of an electronic device according to one embodiment of the present invention.

Referring to FIG. 1A, the electronic device denoted by 100 includes a bus 110, a processor 120, a memory 130, a user input module 140, a display module 150, or a communication module 160.

The bus 110 is a circuit that connects components (e.g., the processor 120, the memory 130, the user input module 140, the display module 150, or the communication module 160) included in the electronic device 100 with each other and transmits communication (e.g., a control message) between the components.

The processor 120 receives commands from the components included in the electronic device 100 through the bus 110, decode the received commands, and perform calculation or data processing according to the decoded commands.

The memory 130 stores commands or data received from the processor 120 or other components (e.g., the user input module 140, the display module 150, and the communication module 160) or generated by the processor 120 or other components.

The memory 130 includes at least one programming module including a kernel 131, a middleware 132, an Application Programming Interface (API) 133, and an application 134. Herein, at least the one programming module may be software, firmware, hardware, or combination of at least two or more of software, firmware, and hardware.

The kernel 131 controls or manages system resources (e.g., the bus 110, the processor 120, or the memory 130) used to execute an operation or function implemented in the other programming modules (e.g., the middleware 132, the API 133, or the application 134). The kernel 131 may provide an interface that may access a separate component of the electronic device 100 in the middleware 132, the API 133, or the application 134 and control or manage the separate component.

The middleware 132 operates as a go-between such that the API 133 or the application 134 communicates with the kernel 131 and transmits and receives data. The middleware 132 performs load balancing for work requests using a method of assigning priority that uses a system resource (the bus 110, the processor 120, or the memory 130) of the electronic device 100 to the work requests received from at least the one application 134.

The API 133 is an interface in which the application 134 controls a function provided from the kernel 131 or the middleware 132. The API 133 includes at least one interface or function for file control, window control, image processing, or text control.

The user input module 140 receives commands or data from the user and transmits the received commands or data to the processor 120 or the memory 130 through the bus 110.

The display module 150 displays videos, images, or data to the user.

The communication module 160 performs communication between the electronic device 100 and other electronic devices 102 and 104. Herein, the communication module 160 may support a local-area communication protocol (e.g., Wireless-Fidelity (Wi-Fi), BlueTooth® (BT), Near Field Communication (NFC), or network communication (e.g., the Internet, a Local Area Network (LAN), a Wide Area Network (WAN), a telecommunication network, a cellular network, a satellite network, or a Plain Old Telephone Service (POTS)).

Each of the other electronic devices 102 and 104 may be the same type as the electronic device 100 or different than the electronic device 100.

Figure 1B:
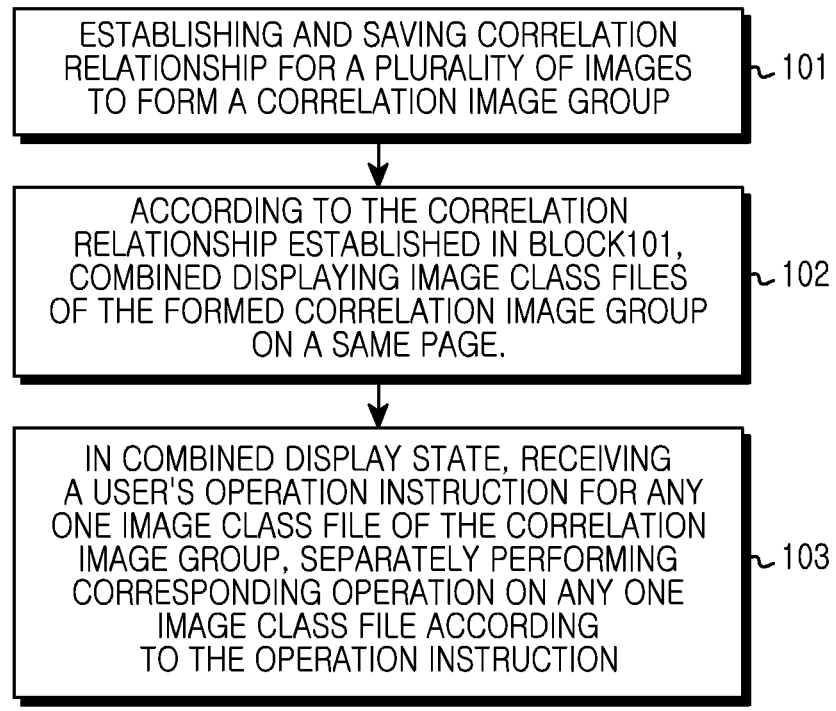
FIG. 1B is a basic flow chart of an image correlation method according to an embodiment of the present invention.

FIG. 1B illustrates an image correlation method according to an embodiment of the present invention. As shown in FIG.

1B, in step 101, a correlation relationship is established and saved for a plurality of images to form a correlation image group.

As described above, the image class file includes images and/or correlation image groups. The formed correlation image group includes various image class files and corresponding correlation relationship. The correlation relationship is to record file information and display position information of each image class file of the correlation image group. When one image class file that has been correlated and includes a correlation image group, file information of this image class file recorded in the correlation relationship can be correlation relationship information of the correlation image group.

In step 102, according to the correlation relationship established in step 101, image class files of the formed correlation image group are displayed on the same page in a combined manner.

In step 103, in combined display state, a user's operation instruction is received for any one image class file of the correlation image group, and a corresponding operation is separately performed on the corresponding image class file according to the operation instruction.

In the process shown in FIG. 1B, the image correlation method of the present invention mainly includes establishment of the correlation relationship, change and deletion of the correlation relationship, combined display of image class files and operations of the image class files in combined display state. In addition, the image correlation method of the present invention can further include sharing of the correlation image group.

Herein, a configuration file is established corresponding to a correlation image group to store a correlation relationship. Establishing a configuration file for a corresponding correlation image group will be taken as an example for illustration.

1. Establishment of the Correlation Relationship

In the image correlation method of the present invention, a correlation relationship can be saved in file format. In this embodiment, recording a correlation relationship in a correlation configuration file will be taken as an example to explain establishment and saving of the correlation relationship.

Specifically, a correlation configuration file is established for a correlation image group to be formed. The correlation configuration file includes various image class files of the correlation image group to be formed, file information and display position information of each image class file after having been correlated.

In addition, considering the possibility of multi-level correlation, the correlation configuration file can further include a correlation identifier, which indicates each image class file of the correlation image group formed to be an image or a correlation image group. Specifically, the correlation identifier can be recorded in binary form, and binary digits can be determined by the number of files that have been correlated. For example, when two image class files are correlated, the correlation identifier can be two digits. Each digit indicates one corresponding image class file to be an image or a correlation image group. If two image files are correlated, the correlation identifier can be recorded as 00 in binary form. If one image and another correlation image group are correlated, then the correlation identifier can be recorded as 01 in binary form.

For an image, its file information can include file name and path information of a corresponding image. For a correlation image group (i.e., multi-level correlation), its file information can include file name and path information of a configuration file corresponding to the correlation image group.

The correlation configuration file can also store display position information of each image class file that can be used to indicate specific display position for each image class file during combined display. More specifically, the correlation configuration file can further include display layout and display effect.

When establishing a correlation relationship, it is also necessary to determine for which image class files to establish a correlation relationship. One embodiment of the present invention provides three modes: Correlation-shooting mode, user instruction mode and system recommending mode. The following will take correlating images as an example for illustration.

A. Correlation-Shooting Mode

The correlation-shooting mode refers to design shooting manners of a camera in a mobile terminal, which helps to automatically correlate several taken images when a user takes pictures.

Specifically, a correlation-shooting mode can be set in a terminal device in advance, and the system automatically generates a correlation configuration file that records a correlation relationship. A plurality of pictures successively taken by the user in the correlation-shooting mode can be recorded in the correlation configuration file with identified correlation relationship, thereby forming a group of correlated pictures. After the user manually exits the correlation-shooting mode, the correlation-shooting ends and pictures taken hereafter will not be added into the correlation image group. The specific operation steps will be explained with reference to the following two examples.

Example 1

Figure 2A:
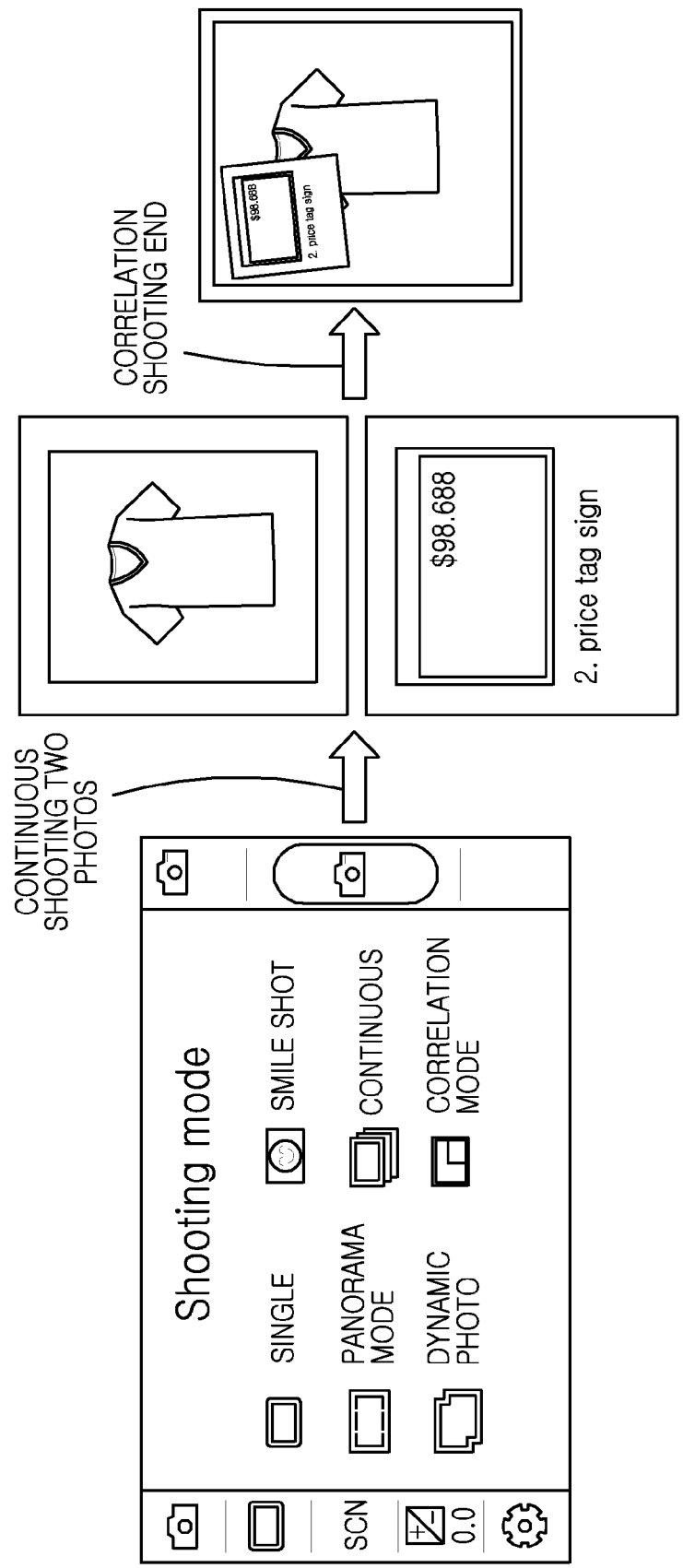
FIGS. 2A-2B are schematic diagrams of establishing a correlation relationship in a correlation-shooting mode according to an embodiment of the present invention.

As shown in FIG. 2A, for taking two pictures and establishing a correlation relationship:

1. The user selects the correlation-shooting mode, a configuration file that records correlation relationship is created within the system, and default correlation display and control manner in the configuration file are selected;

2. The user continuously takes two pictures, the system records file attributes including file names and file paths of the two pictures in the correlation configuration file created in step 1 and identifies correlation relationship;

3. The user selects to end the correlation-shooting mode; and

4. The system stores the configuration file created in step 1, determines a correlation relationship between the two pictures taken in step 2, records a correlation identifier as 00 in the correlation configuration file, distributes the two pictures according to the default correlation display and displays the pictures.

The pictures taken in the correlation-shooting mode can adopt any combined display manner of the present invention. FIG. 2 is only an example of adopting an overlapping display.

Example 2

Figure 2B:
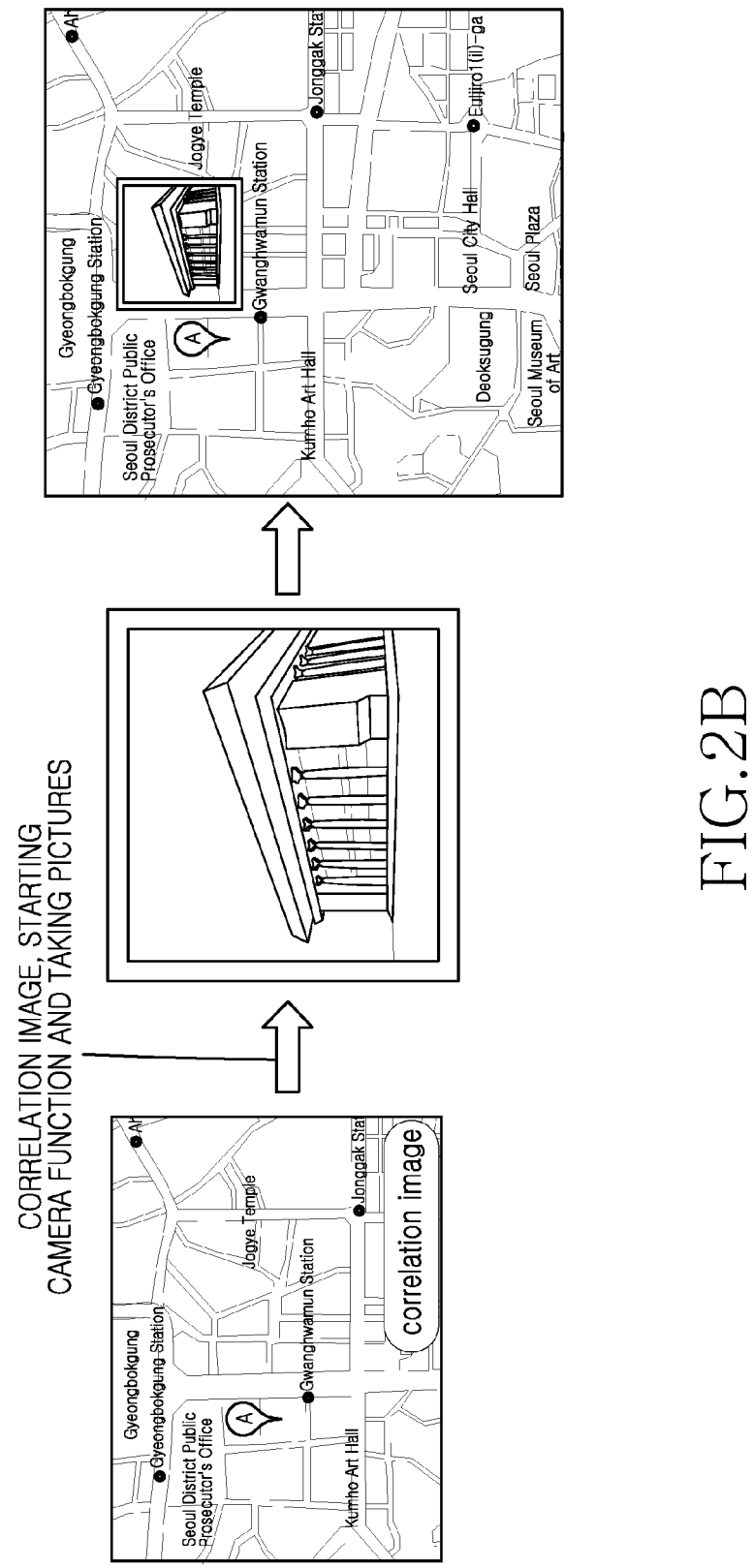

A user takes new pictures on an existing image and correlates the new pictures with the existing image, as shown in FIG. 2B.

1. The user selects and takes a screenshot of a map location in map software;

2. The user selects "correlation image", and the system creates a correlation configuration file of this image; information of this image, including file name and file path, is recorded in the correlation configuration file;

3. The user selects "taking pictures";

4. Starting camera function of a terminal and taking a picture of a building at the current position; and 5. Ending the shooting.

The system records file information including file name and file path of the taken picture in the correlation configuration file created in step 2. The system adds a correlation identifier of this picture and the image of step 1 in the correlation configuration file, and the correlation identifier is 00. The system sets a default correlation display layout and control manner in the configuration file. The system saves the correlation configuration file, and establishes correlation relationship between the screenshot file of step 1 and the new picture taken in step 4, thereby forming a correlation image group.

The system displays the correlated screenshot image and the new picture taken in step 4. The display layout and control select the default settings. FIG. 2A provides an example of adopting a correlation-overlapping display.

B. User Instruction Mode

Figure 3:
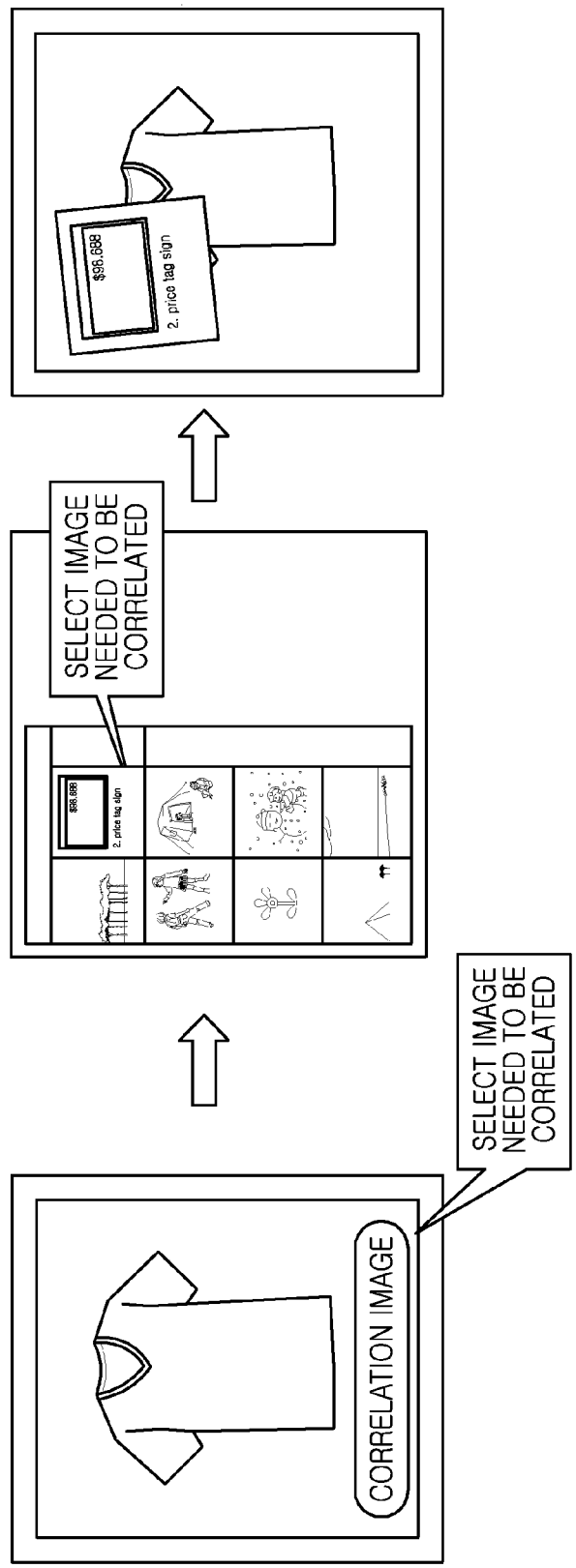
FIG. 3 illustrates a user selecting two images in a gallery to establish a correlation relationship according to an embodiment of the present invention.

According to the user's instruction, a plurality of image class files selected by the user in a terminal device can be correlated. As shown in FIG. 3, steps that the user selects two images in a gallery to establish a correlation relationship include:

1. The user selects one image in the gallery, and clicks "correlation image" button or selects "correlation image" function in a menu. The system automatically establishes a correlation configuration file of this image, and records file information including, for example, file name and file path of this image in the correlation configuration file.

2. The user selects one or more images needed to be correlated. The system records file name and file path of the selected one or more images in the configuration file established in step 1, and establishes a correlation identifier of all image files of step 1 and step 2. Default settings such as default correlation layout and correlation manipulation can be added in the configuration file. A correlation relationship between the image of step 1 and the one or more images selected in step 2 has been established.

3. According to the setting of the correlation layout and correlation manipulation in the configuration file, the system correlated displays the above correlated images.

The user can also directly perform step 2 and step 3, i.e., selecting several images needed to be correlated in the gallery to perform image correlation.

C. System Recommending Mode

According to detection of image properties, the correlation system recommends images to be correlated with an image specified by the user. The user selects images from the recommended images for correlation, and determines to correlate the image specified by the user with the images selected by the user.

Steps that the user selects "recommending correlation" function in the gallery to establish image correlation relationship are as follows:

1. The user selects one image in the gallery and clicks "recommending correlation" button or selects "recommending correlation" function in a menu;

2. The mobile terminal shows three recommending modes including image matching, GPS matching and time matching for the user to choose; and 3. After the user makes a selection, according to the mode selected by the user, the mobile terminal displays top N matching images for the user to choose.

When the system recommends images according to the detection of image properties, through the three modes such as image matching, GPS matching and time matching, the system can recommend a plurality of logically related images for the user to choose whether to establish a correlation relationship. The three matching modes will be described as follows:

1) Image Matching

The system filters images having similar features from the gallery through the image recognition technology and recommends the filtered images to the user for correlation.

Figure 4A:
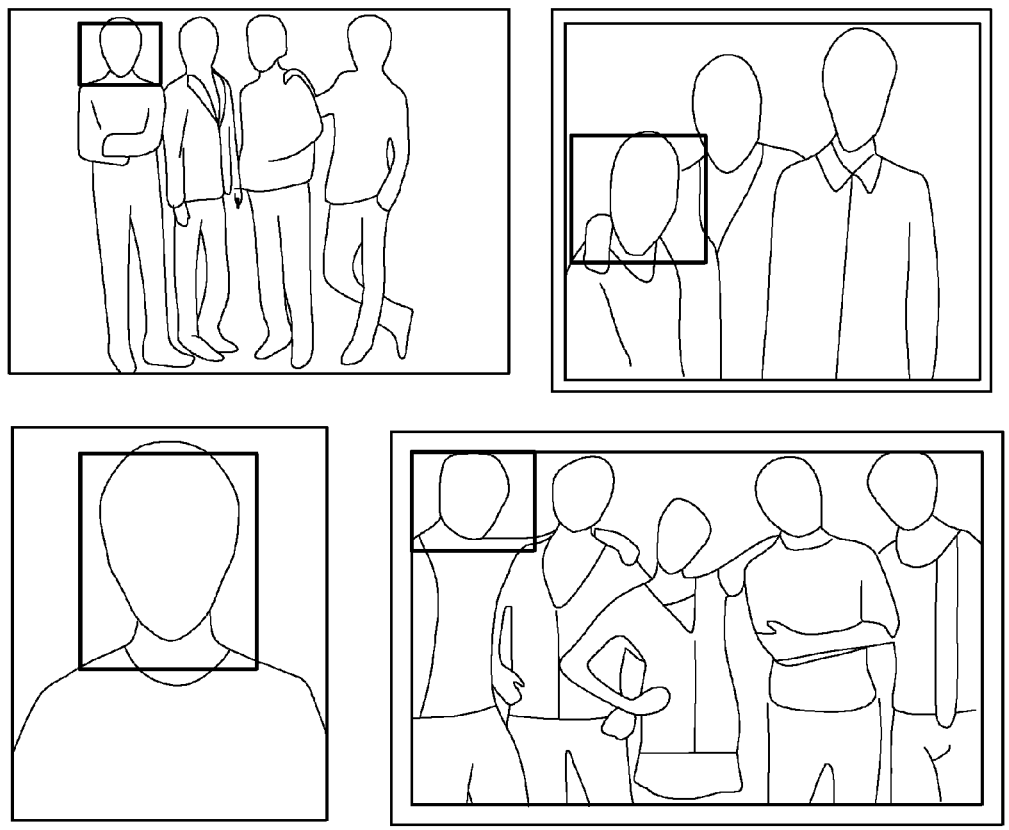
FIGS. 4A-4D illustrate a system recommending images to establish a correlation relationship according to an embodiment of the present invention.

For example, as shown in FIG. 4A, a plurality of pictures contain a same character portrait, through the image recognition technology, the system recognizes that four images in the following figure contain human face information of the same character and displays the four images to the user, so as to recommend the four images for the user to perform correlation. If the user determines to correlate the four images, the system automatically establishes a configuration file, and records in the configuration file, file names and file paths of the four images that are recommended by the system and determined by the user as shown in FIG. 4A.

A correlation identifier of the above four images, image display layout after correlation can be the default display layout and can be custom set by the user, and control manner of the images after correlation can be the default control manner and can be custom set by the user. After establishment and saving of the correlation configuration file, setting of the correlation is ended, and the correlation relationship recommended by the system is established. The four images in FIG. 4A can be correlated, displayed and controlled.

Figure 4B:
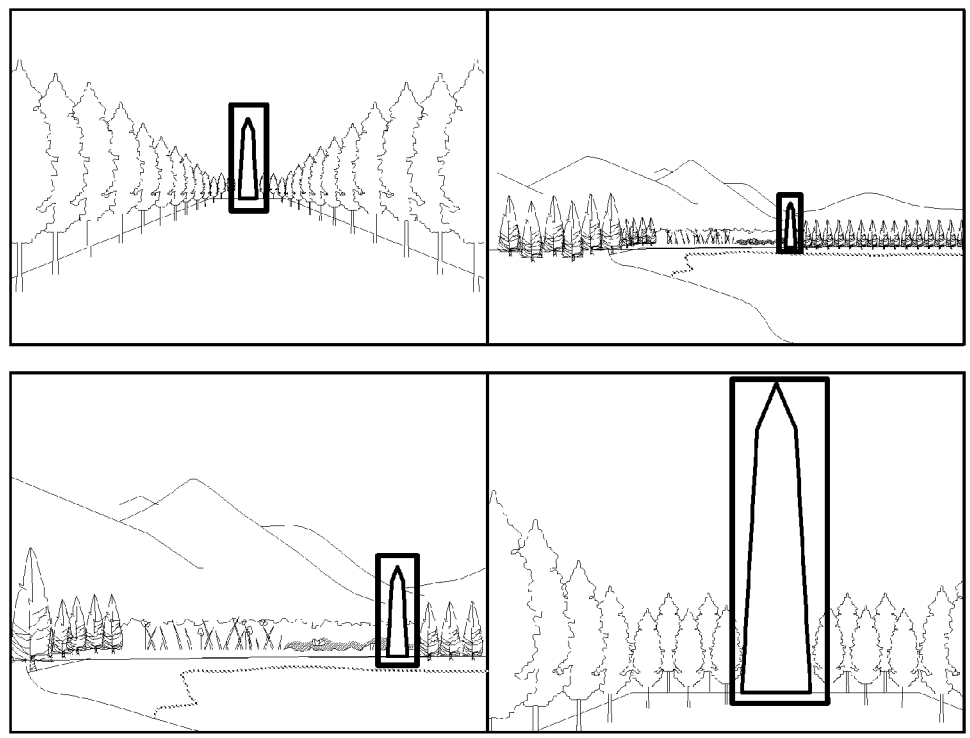

In another example shown in FIG. 4B, through the image recognition technology, the system recognizes that four images shown in FIG. 4B have similar feature points, i.e., a pagoda shown in FIG. 4B. In this embodiment, the image correlation system displays the four images to the user as recommended correlated images. If the user determines to correlate the four images, the system automatically establishes A correlation relationship. The process of establishing a correlation relationship is consistent with the process of the above example shown in FIG. 4A.

2) GPS Matching

Figure 4C:
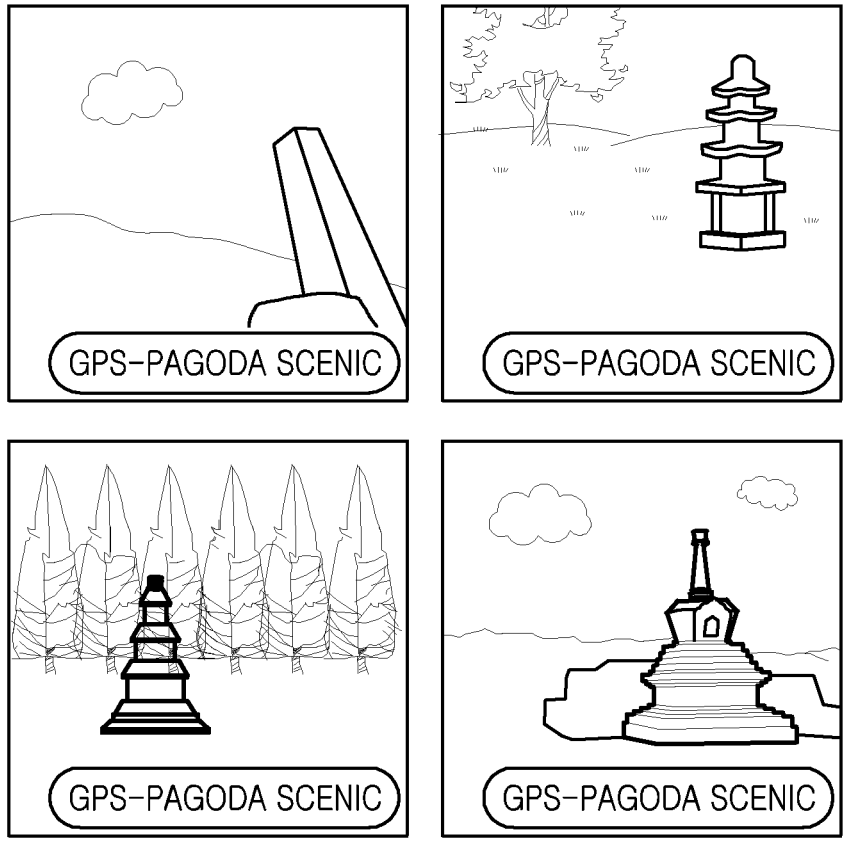

The image correlation system compares GPS information in properties of all image files of the gallery, and centralized displays image files having consistent GPS information to the user, and recommends the user to correlate the images obtained through comparison and having consistent GPS information. For example, as shown in FIG. 4C, the image correlation system centralized displays the four image files having the same GPS information, i.e., "gps-pagoda scenic", and recommends the user to perform correlation. If the user determines to correlate the four images, the system automatically establishes a correlation configuration file.

In the correlation configuration file, file information such as file names and file paths of the four images, correlation identifier 0000, default correlation display layout template and correlation manipulation manner are recorded. The system saves the correlation configuration file, the correlation relationship is established for the four images and the four images can be correlated displayed and controlled.

3) Time Matching

Through comparing shooting time attributes of all picture files, the image correlation system can recommend images to the user and an interval between a shooting time of each recommended image and the image specified by the user is less than a threshold. The criteria of the time threshold can be set by the user.

Figure 4D:
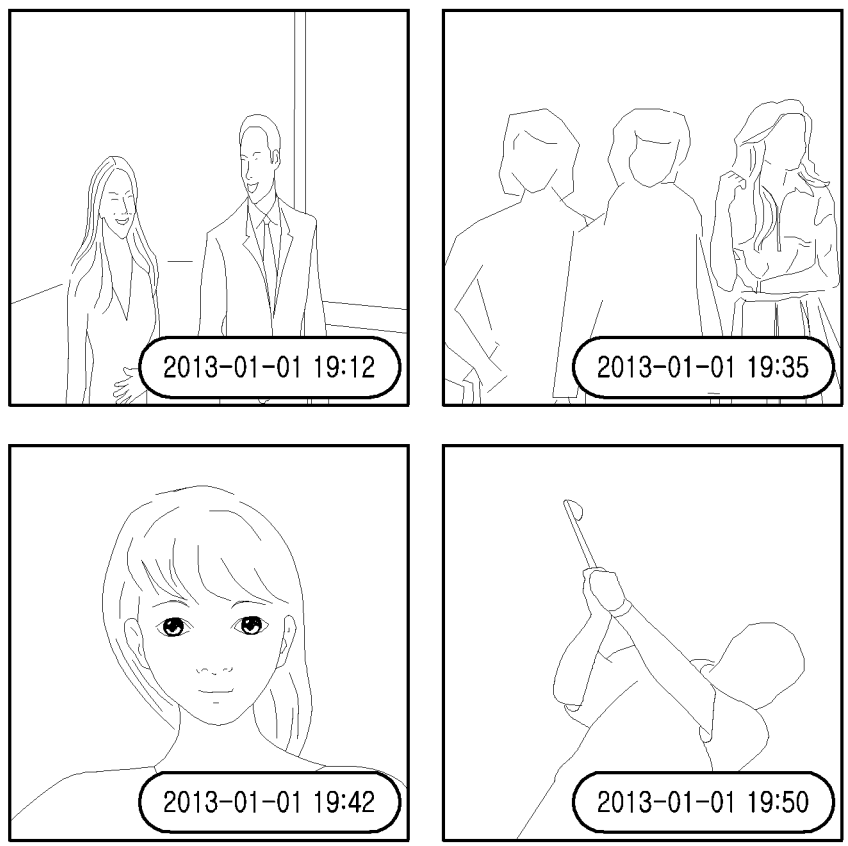

For example, as shown in FIG. 4D, for pictures taken at one party, the user can set one hour as the time threshold. The image correlation system can recommend to the user following images taken within one hour from the shooting time of the image specified by the user, for example, images having a shooting time in from 2013-01-01 19:01 to 2013-01-01 20:01 will be recommend for correlation. If the user confirms the recommended correlation relationship, the image correlation system centralized displays the recommended correlated image files. The system automatically establishes a correlation relationship for the images shown in FIG. 4D. The process of establishing a correlation relationship for the recommended images is consistent with the process of establishing a correlation relationship shown in FIG. 4A.

In the above processes of establishing a correlation relationship, the single-level correlation is taken as an example for establishing a correlation relationship for a plurality of images. As mentioned above, in the present invention, multi-level correlation can also be established, i.e., establishing a correlation relationship for an image and a correlation image group, or establishing a correlation relationship for a plurality of the correlation image groups. The establishment of the multi-level correlation relationship will be simply introduced below.

Figure 5:
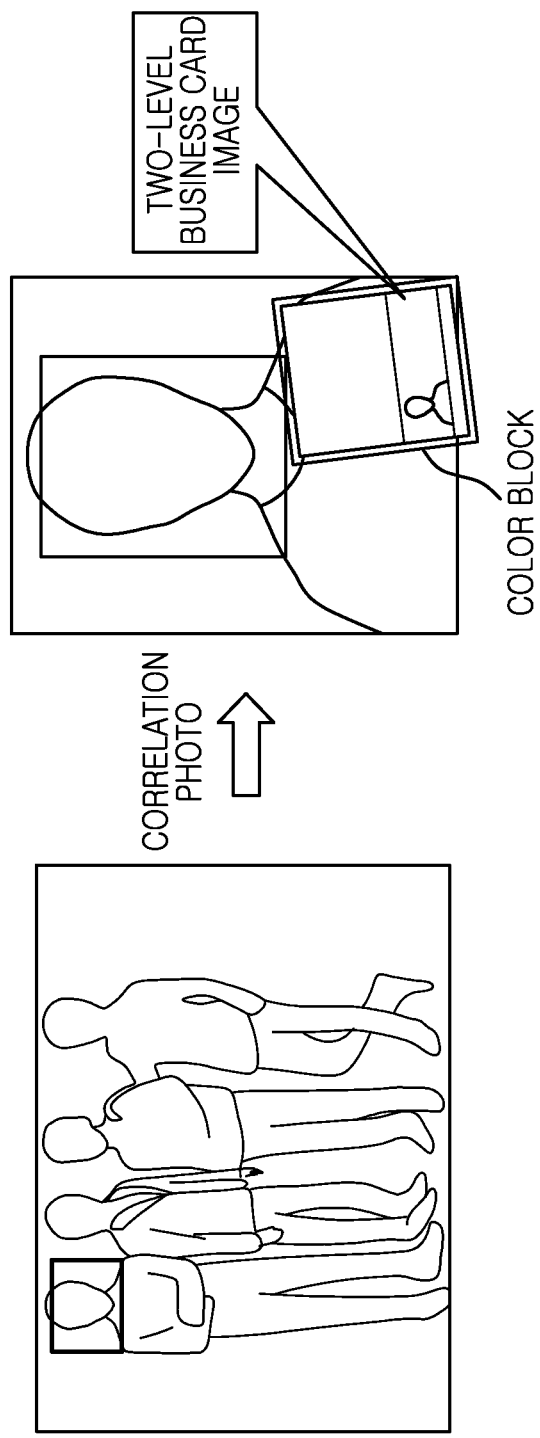
FIG. 5 illustrates establishing multi-level correlation relationship according to an embodiment of the present invention.

As shown in FIG. 5, a correlation relationship is established for the first group photo image and an individual photo of one character, and a second level correlation relationship is established for the individual photo and another business card photo. Thus, this example establishes a two-level correlation relationship.

The establishment is as follows:
1. The system automatically establishes a correlation configuration file;
2. The system records a file name and file path of a picture 1 shown in FIG. 5 in the correlation configuration file, and records ID of a correlation configuration file of the second correlated image shown in FIG. 5 in the correlation configuration file of the FIG. 5. This correlation is a correlation between one image file and a correlation image group;
3. The system records a correlation identifier in the correlation configuration file and the correlation identifier can be set as a binary code 01 which identifies the correlation relationship to be a correlation between one image and one correlation image group;
4. The system records default display layout in the configuration file; for example, the second correlated image is hidden on the first image shown in FIG. 5, in the display layout, a hidden identifier can be established to identify that the correlated image is hidden displayed. Position coordinates of a color block which is shown in FIG. 5 and is to identify hidden, are also recorded in the display layout information of the configuration file; and
5. The system records default correlation manipulation in the correlation file.

The system saves the above established correlation configuration file, and the multi-level correlation relationship shown in FIG. 5 is established.

II. Changing and Deleting a Correlation Relationship

After the establishment of the correlation relationship, the user's deletion instruction for any one image class file of the correlation image group can be received, and the file information and the display position information of this image class file can be deleted from the correlation relationship. When the correlation relationship saves the file information and the display position information of only one image class file, after confirmation by the user, corresponding correlation relationship can be deleted.

Alternatively, the user's changing instruction for any one image class file of the correlation image group can be received, the file information and the display position information of corresponding image class file can be deleted from the correlation relationship, and file information and display position information of a changed image class file specified by the user can be added into the correlation relationship.

Figure 6A:
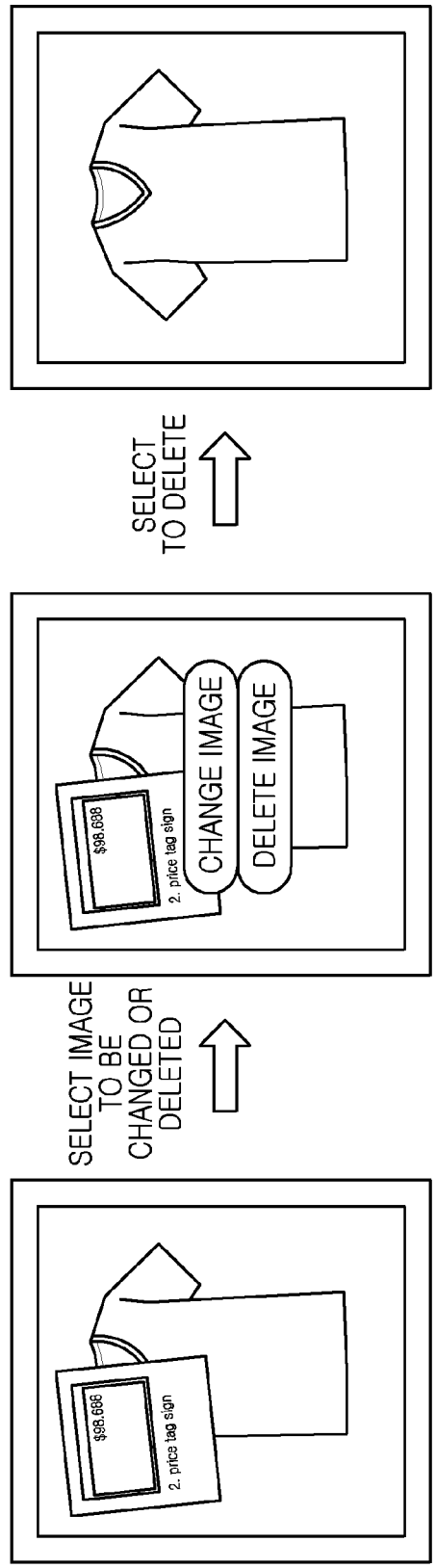
FIGS. 6A-6B illustrate changing and deleting a correlation relationship according to an embodiment of the present invention.
Figure 6B:
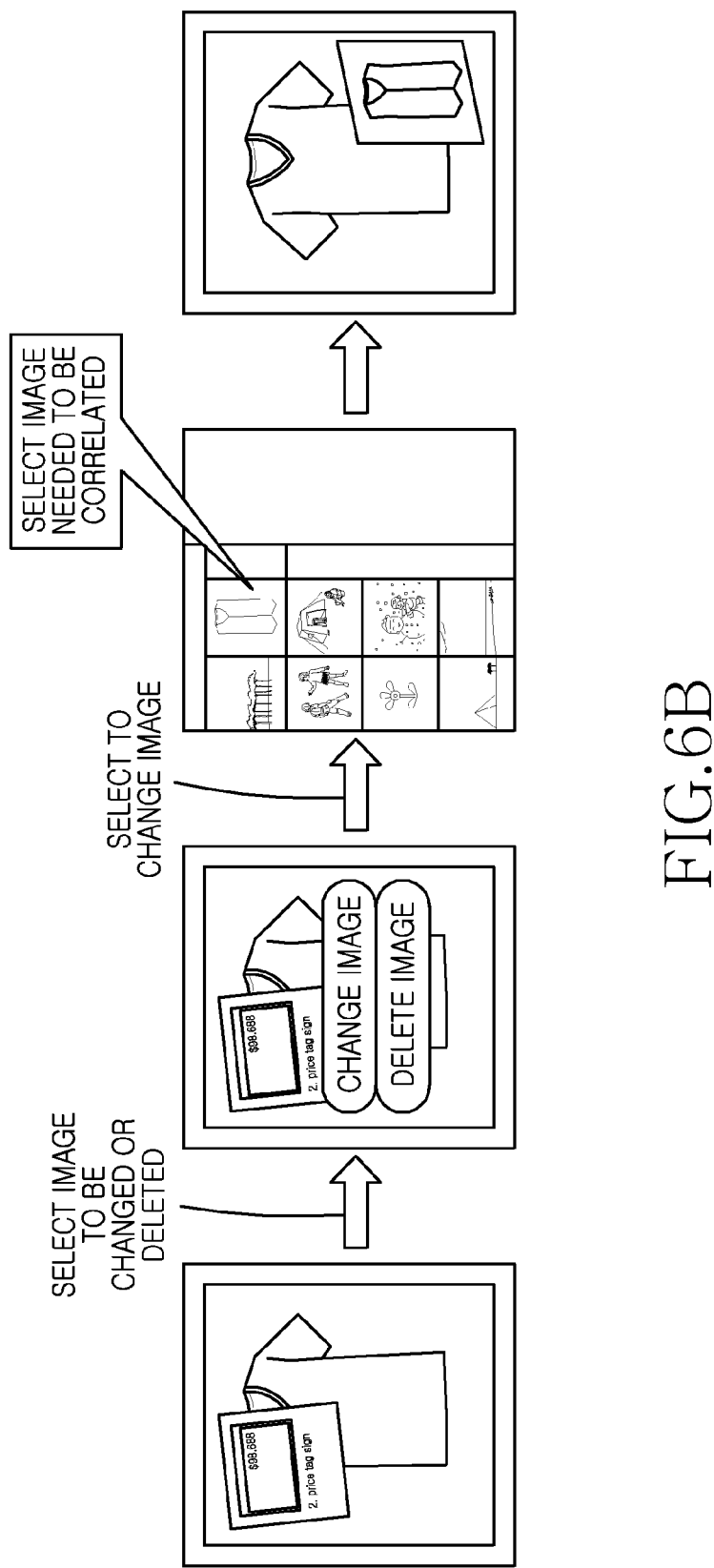

The user changes and deletes the correlated image class files in the following process, as shown in FIGS. 6A-6B:
1. The user selectively opens correlated displayed images;
2. The user selects one image needed to be changed or deleted, after long pressing, options "changing image" and "delete image" appear, as shown in FIG. 6A and FIG. 6B;
3. As shown in FIG. 6A, the user selects "delete image", then the system deletes information such as file name and file path, et al. of this image from the correlation configuration file, and deletes the correlation identifier. The image selected by the user for deletion will be deleted from the correlation relationship, and the correlation relationship for the two images is terminated. If the user chooses an operation of saving the image deleted, then the system deletes the correlation configuration file, and original image will become an independent image file without correlation relationship; and
4. As shown in FIG. 6B, if the user selects "change image", then the system enters into the process of selecting corrected images to perform steps in B 1-2 so as to establish a correlation relationship with the selected new image; the system records file name and file path of the newly selected correlated image in the correlation configuration file and establishes a new correlation identifier. The system correlated displays the newly established correlation image group.

III. Display and Operation of the Correlation Image Group

Usually, two display modes including independent display mode and correlation display mode can be provided for a terminal device to display images. After the independent display mode is activated, the gallery shows independent image files, and correlation image groups having established correlation relationship are not shown. When the correlation display mode is activated, the gallery shows various correlation image groups having established relationship currently in the system. Through the user's click, one correlation image group can be selected and displayed on the terminal device.

In the correlation display mode, after receiving the user's instruction of displaying correlation image group (for example, the user clicks a thumbnail to send a display instruction), the present invention discloses how to display the correlation image group on a display screen of the terminal device.

Figure 7:
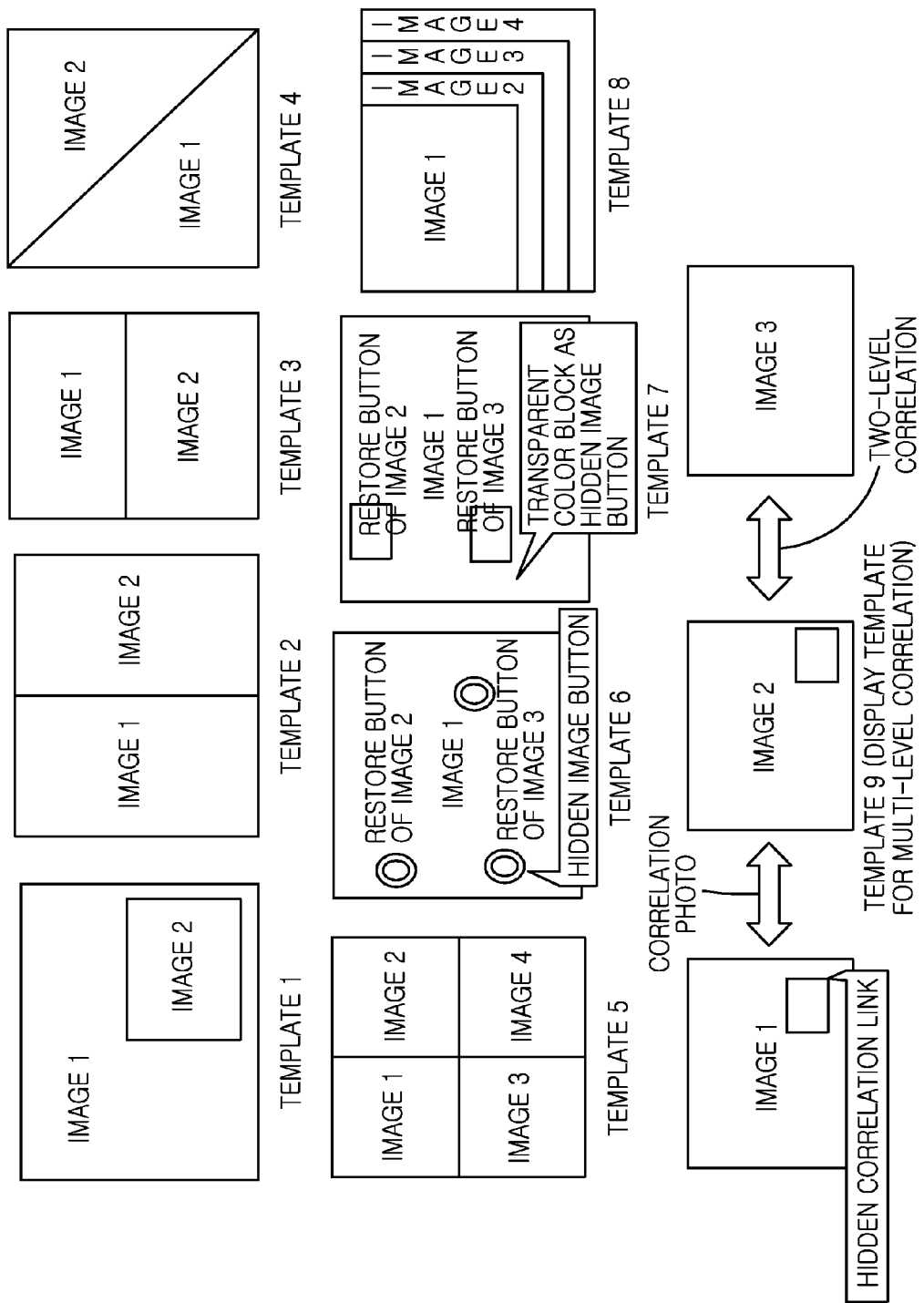
FIG. 7 illustrates several correlation display templates according to an embodiment of the present invention.

Specifically, a variety of display templates can be set in advance in the system for the use of the user. The user can set a display layout of images after correlation by selecting one display template or using a default template in the system, and can also create a customized correlation display layout and customize a correlation display template. The set display layout is stored in the correlation relationship. In this manner, when displaying the correlation image group, the image class files of the correlation image group can be correlated displayed according to the display layout stored in the correlation relationship. For example, several correlation display templates are shown in FIG. 7.

The user can select one template as a default display layout; when creating the correlation relationship and establishing the correlation configuration file of the correlation image group, the default template of the correlation display and control information can be recorded in the correlation configuration file as a default display layout. The display template records an identifier of a hidden displaying image, location information of a displayed image and supported control. If the user selects a new correlation layout after the images have been correlated, the system updates the display layout information of the correlation configuration file and records the new correlation layout.

The above description is specific processing of the correlation image group for combined displaying. In the combined displaying state, an operation instruction corresponding to each correlation image file can also be received and the image file can be separately operated. The general operation instruction can include position sliding, scaling, hiding, display and/or double click, for example.

In order to perform separate operation of each image class file of the correlation image group, a valid range of each image class file can be stored in the correlation relationship. In this manner, after one operation instruction is detected in the valid range corresponding to one image class file, this detected operation instruction is treated as an operation instruction of the corresponding image class file.

Considering the possibility of multi-level correlation, when one correlated image class file is a correlation image group, the process of separately performing a corresponding operation on the correlation image group according to an operation instruction includes performing, in the combined displaying state, a corresponding operation on all images that are of corresponding correlation image group and taken as a whole.

The display and operation processes of the correlation image group will be explained hereinafter with reference to examples of performing correlation display and operation on two images and a plurality of images, respectively.

Figure 8A:
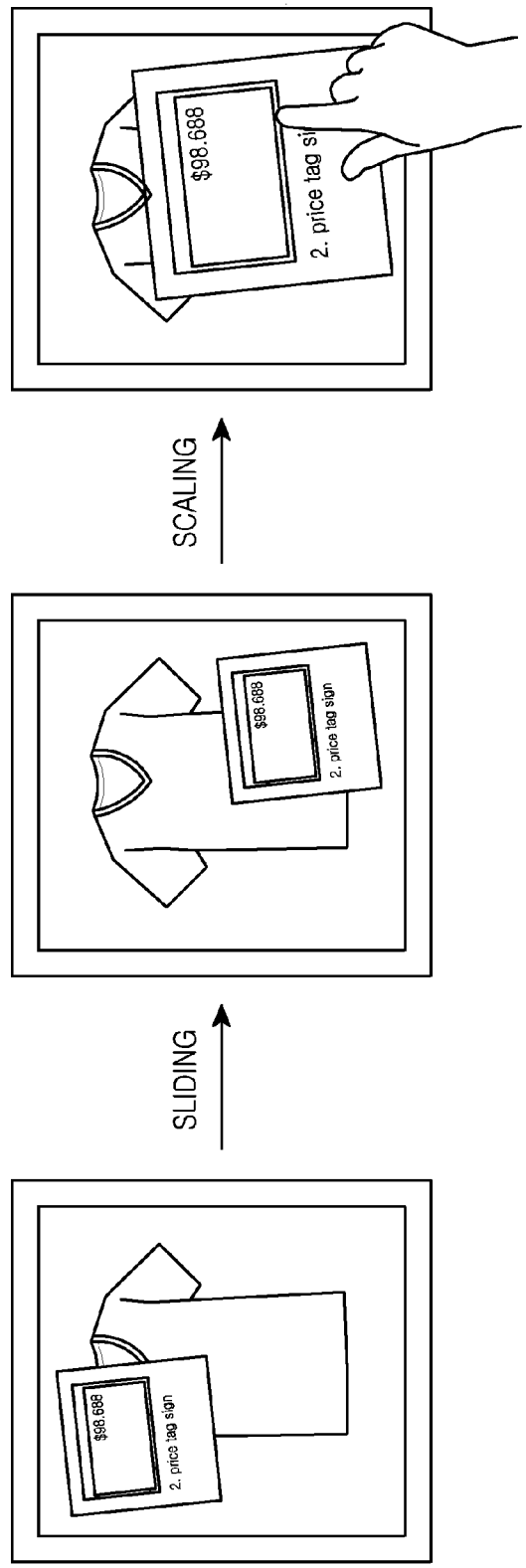
FIGS. 8A-8C illustrate operation of two images that have been correlated to each other according to an embodiment of the present invention.

As shown in a first picture of FIG. 8A, two correlated images can be displayed by using a first template in FIG. 7. The control of the correlated images includes position sliding, scaling, double click, and hiding of the images, for example.

As shown in FIG. 8A, for a touch screen mobile phone user, the user can select one correlated image needed to be sided and freely drag the selected image to different positions. The user can also use one or more fingers to perform scaling control of one image needed to be enlarged or shrunk.

When a received user instruction is position sliding, a corresponding image class file can be displayed on an indicated position according to the operation instruction. After confirmation of the user and the end of the position sliding instruction, the current position information of the corresponding image class file can be stored in the correlation relationship.

When a received user instruction is scaling operation, display size of all images of corresponding image class file can be adjusted according to the operation instruction. After confirmation by the user, the current display size of the corresponding image class file that has been adjusted can be stored in the correlation relationship.

Figure 8B:
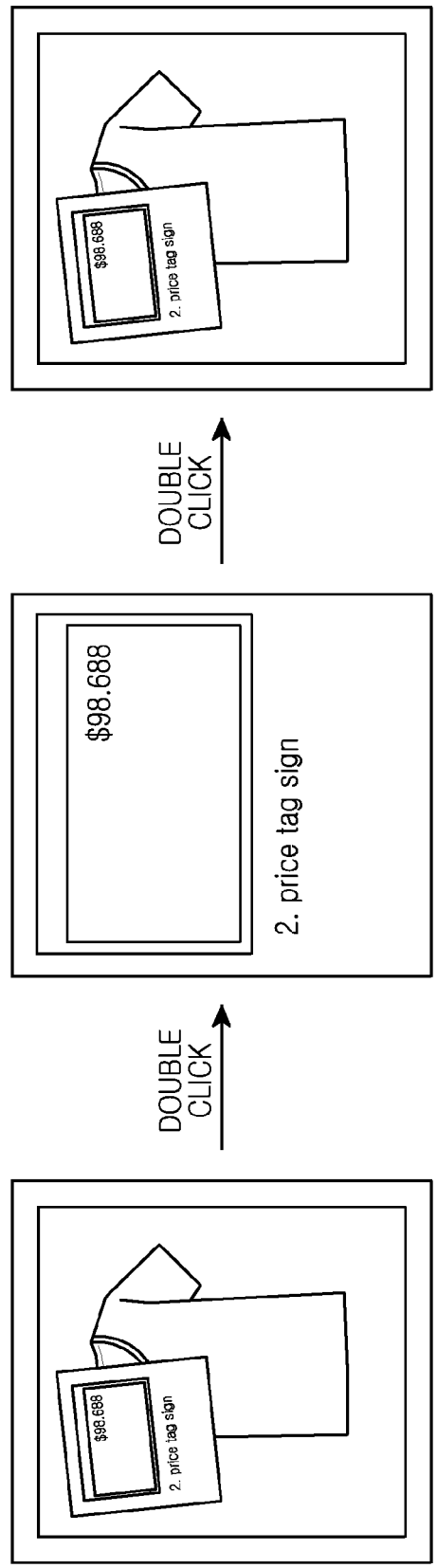

One example of double click operation of one image of the correlation image group is shown in FIG. 8B. When the user double-clicks on one of overlapping displayed images, the clicked image is displayed in the maximized state. When the user double-clicks on the image again, the image is restored and displayed in an overlapping display layout of thumbnails.

For hiding or display operation of one image of the correlation image group, a corresponding hide identifier can be stored in advance for each image class file in the correlation relationship (e.g., correlation display layout). In the combined display state, according to the hide identifier corresponding to each image class file, it is determined whether to display corresponding image class file. When receiving the user's hide operation instruction for one image class file, the corresponding image class file is hidden according to the instruction. After confirmation by the user, the hide identifier corresponding to the corresponding image class file can be recorded as hidden. When receiving the user's display operation instruction for one image class file, the corresponding image class file is displayed according to the instruction in the combined display state. After confirmation by the user, the hide identifier corresponding to the corresponding image class file can be recorded as a display.

Figure 8C:
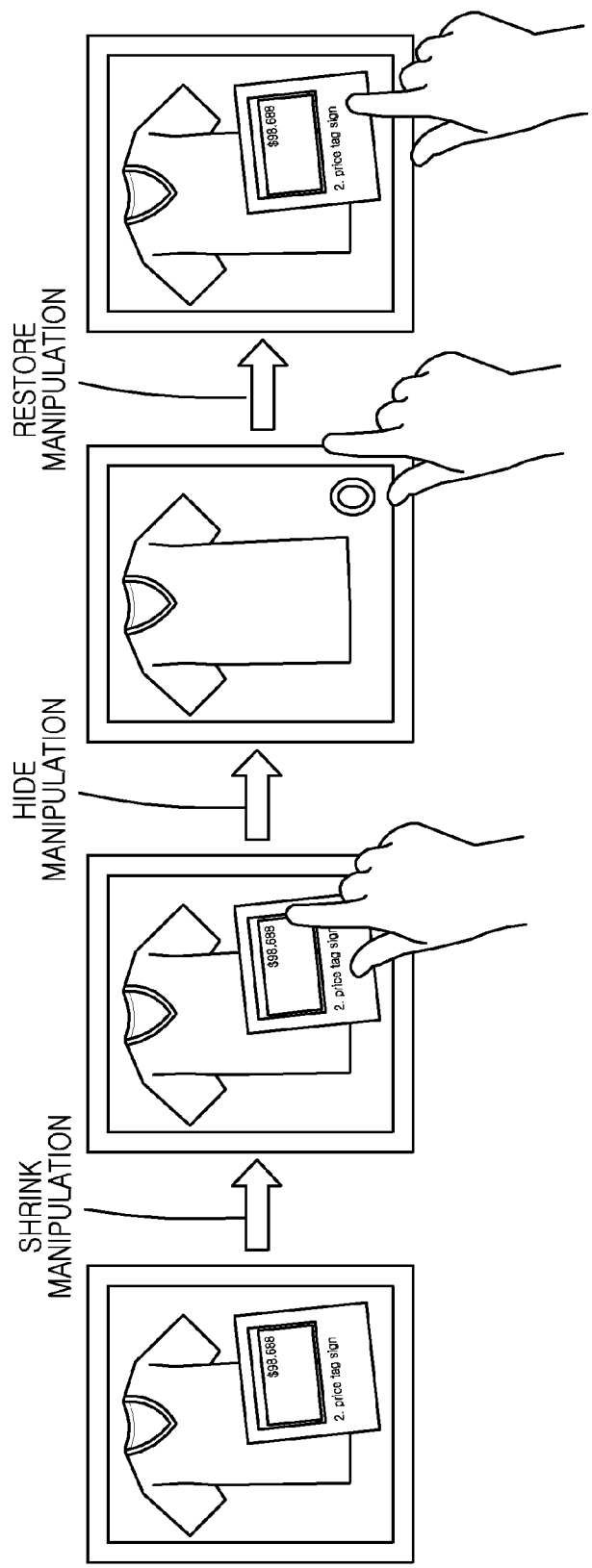

Specifically, the user can realize hiding and display operations of correlated images through two types of operations. In a first type, the user long presses one image needed to be hidden until a "hidden image" option appears, thereby realizing hidden of the correlate image. In a second type, as shown in FIG. 8C, the user can perform a shrink operation by using two fingers to slide inwardly from diagonal positions of one image. When the image is shrunk to a certain extent, the image is hidden and a button appears. After the user clicks the hide button, the hidden image is restored and is displayed.

After the hide operation is completed and saved, the system can record a hide identifier in the display layout information of the correlation configuration file.

Through the foregoing, the user can re-adjust the display layout and display an effect of the correlated images through a variety of operation instructions. The user can select a save operation so that the new layout, the hide identifier of display effect and display position information of images can be stored in display layout information of a correlation configuration file that records this correlation relationship.

Examples of displaying and operating of two correlation image groups each formed by a plurality of correlated images are given in FIGS. 9A-9D, as described below. For example, in a group photo of persons who joined in a party, business card images of some persons in the group photo can be correlated.

Figure 9A:
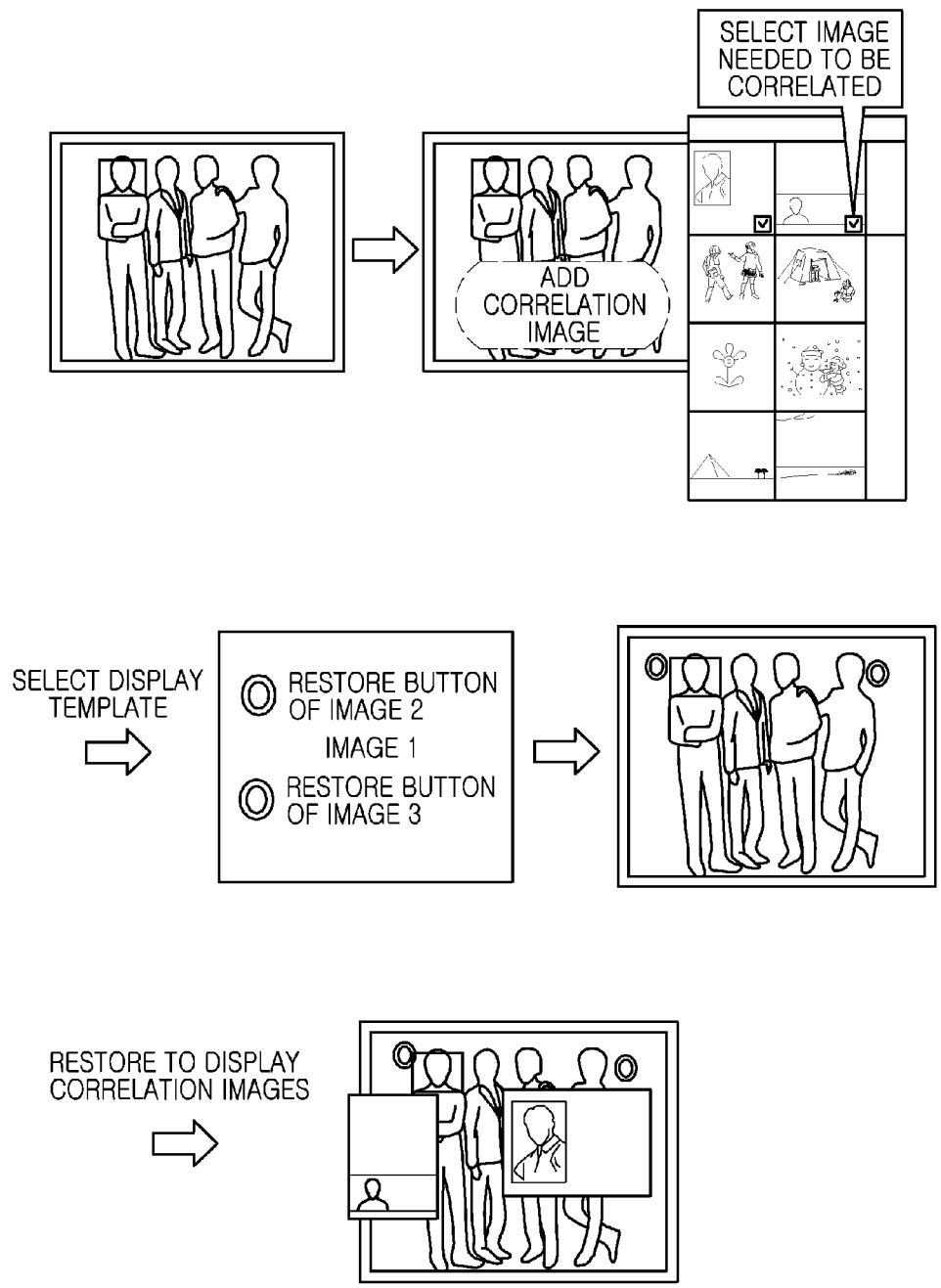
FIGS. 9A-9D illustrate displaying and operation of several images that have been correlated to each other according to an embodiment of the present invention.

Example 1 of correlating a plurality of photos is shown in FIG. 9A, and includes following steps:

1. Assuming that a first picture of FIG. 9A is a group photo of persons who joined in a party; long pressing one position of the photo until an "add correlation image" option shown in FIG. 9A appears;

2. The user selects one business card image of one person who joined the party from the gallery and confirms correlation;

3. Repeating steps 1 and 2 so as to establish a correlation relationship for the group photo and the business card images of several persons who joined the party;

4. Selecting one display template for correlating a plurality of photos; for example, a display temple 6 which hides a plurality of correlated images as shown in FIG. 7;

5. The display effect of a plurality of correlated images is shown in FIG. 7, and the user can click the hide button to restore the hidden correlated images; and 6. The user can drag the hide button so as to place the hide button near a character portrait requiring correlation.

Figure 9B:
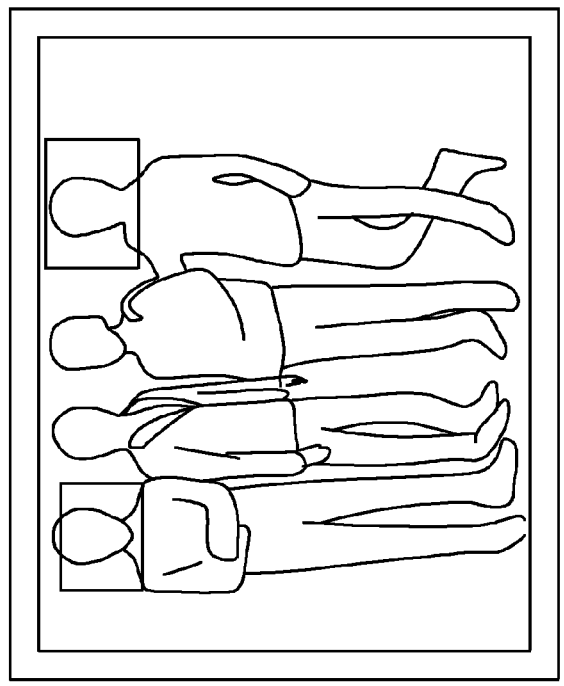
Figure 9B:
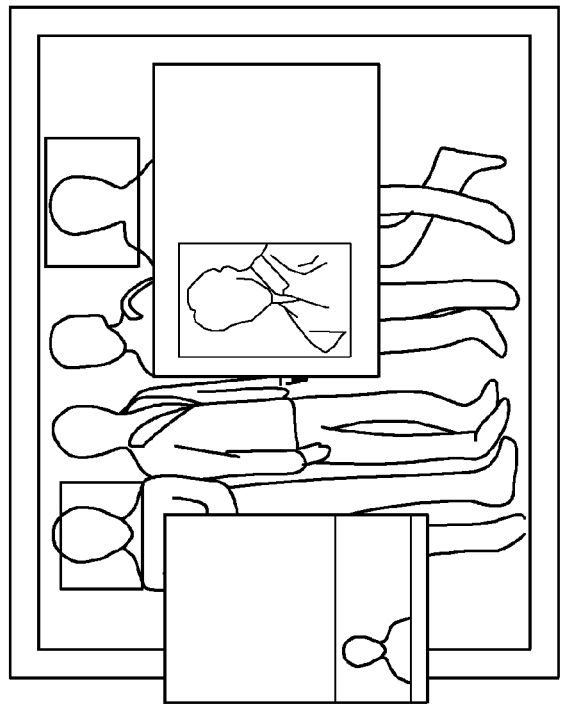

The correlation image group established through the manner of the above steps 1-3 can also use a transparent area of a display template 7 in FIG. 7 to perform hidden displaying. The displaying effect of hiding and restoring correlation is shown in FIG. 9B as described below.

After establishment of the above correlation relationship for a plurality of images, following correlation controls can be performed:

1. Moving and scaling of each correlated image;

2. Hiding correlated images; after hiding, the button can also be moved on the correlated group photo; and 3. The correlated images can be displayed in an overlapping manner.

Figure 9C:
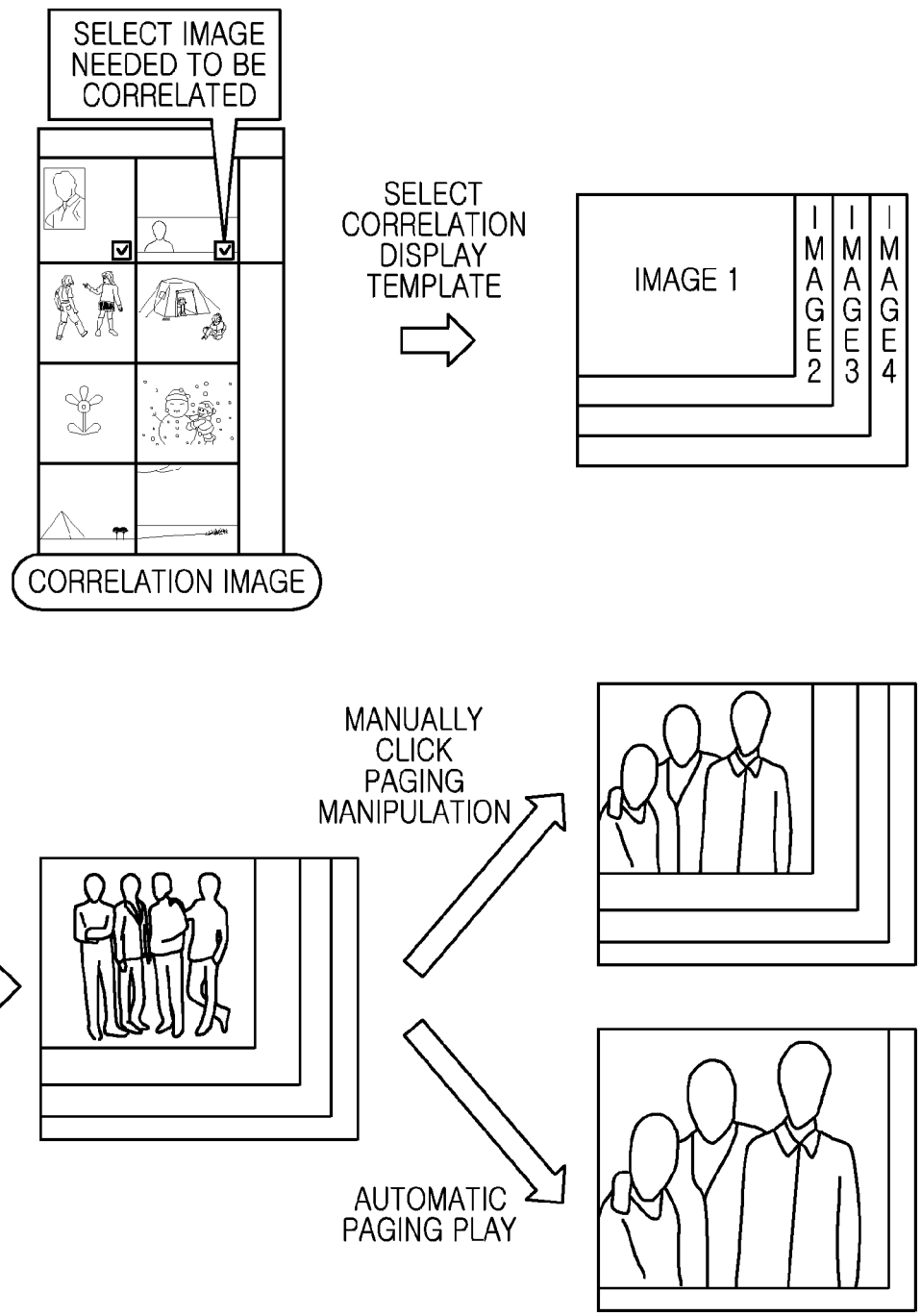

Example 2 of correlating a plurality of photos is shown in FIG. 9C, a plurality of party photos taken during a party can be centrally saved as a theme album.

1. The user selects a plurality of party photos from the album;
2. The user selects a correlation display template, for example, template 8 of FIG. 7 (a template of overlapping display of a plurality of images); and
3. Images can be correlated displayed as shown in FIG. 9C.

Controls after correlation are as follows:

1. Manual click paging manipulation: Clicking on a lower right edge of a photo to perform paging down manipulation, and clicking on a paging margin at an upper left corner to perform paging up manipulation; and
2. Automatic paging play: The user can select a automatic paging play mode to view a plurality of correlated photos.

Figure 9D:
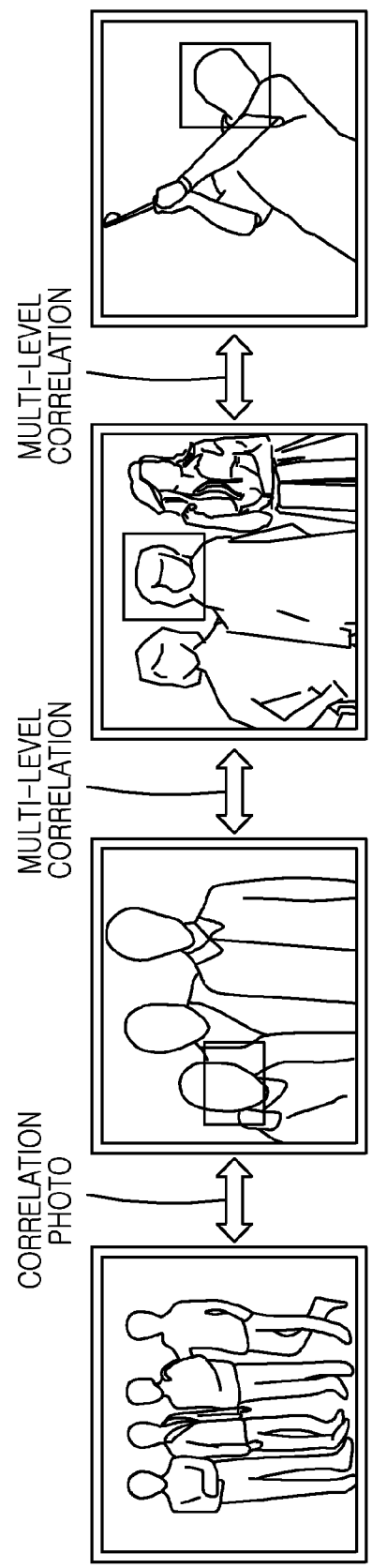

As shown in FIG. 9D, example 3 of correlating a plurality of photos can use a display template 9 of the multi-level correlation link of FIG. 7. The correlation image group in this display template has multi-level correlations in which each level image group can be hidden in a correlated correlation image group.

IV. Sharing of the Correlation Image Group

The correlation image group formed according to the image correlation method provided in the present invention can be socially shared. Specifically, each image class file of the correlation image group and corresponding correlation relationship can be bound together and shared on the network, or shared with other terminal devices. When an established correlation image group is a multi-level correlation, it is necessary to bind all image class files and each correlation configuration file together for sharing. In a specific binding manner, each corresponding file can be packaged into the form of a packet.

Specifically, the sharing of correlated images can be divided into two forms. One of the forms is based on an application program which supports the function of correlating images of the present invention, and can directly parse and display a shared correlation image data packet. Another form is to compress, through common data sharing manner, data information of the correlated images into a data package, and transmit the data package to a sharing peer. If the sharing peer does not install an application program which supports the image correlation technology of the present invention, the sharing peer can directly obtain correlated image files from the compressed package, and display and save each image file contained in the correlation data package, respectively.

Examples of sharing a correlation image group and specific operation of a sharing peer on the correlation image group are as follows.

Figure 10A:
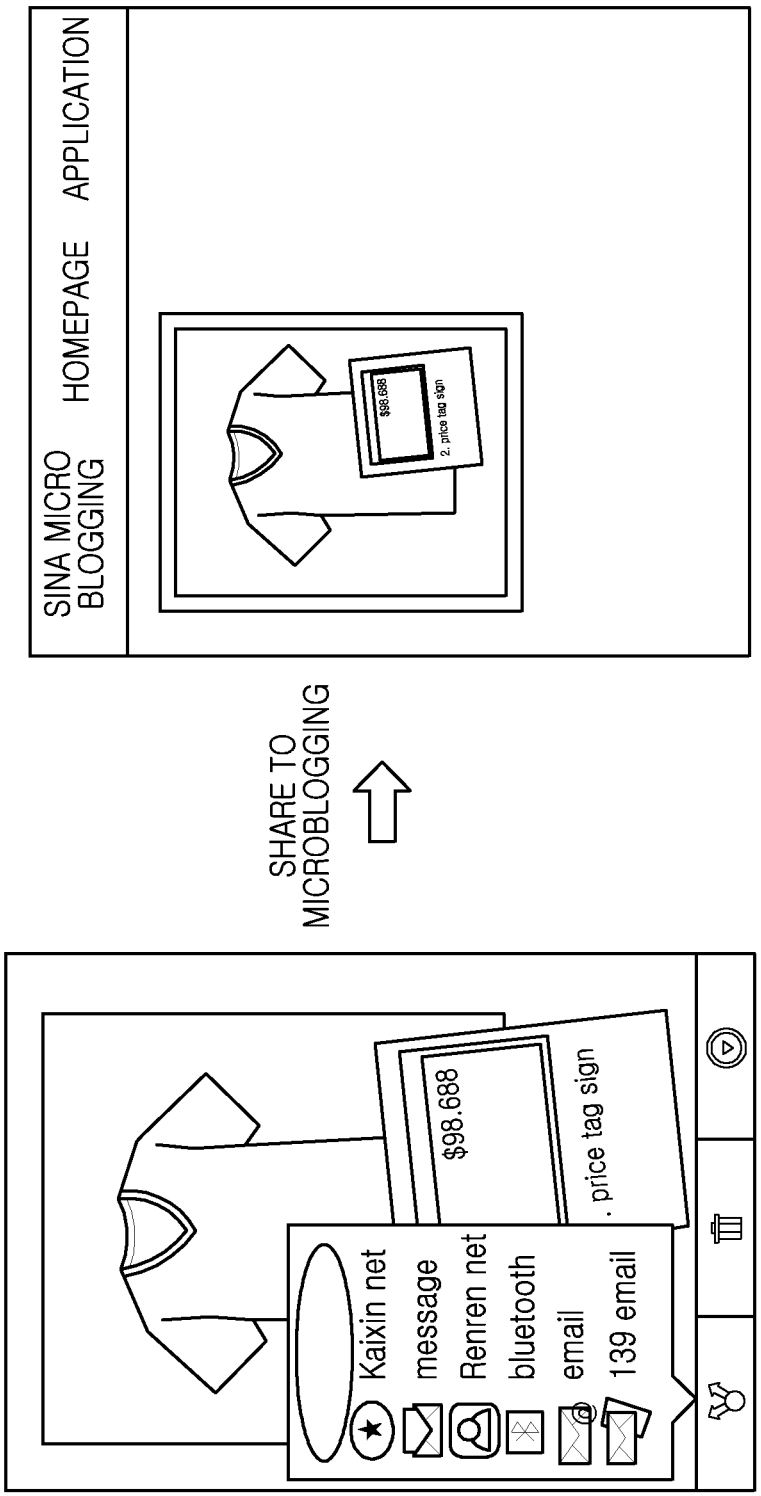
FIGS. 10A and 10B illustrate operation of sharing a correlation image group according to an embodiment of the present invention.
Figure 10B:
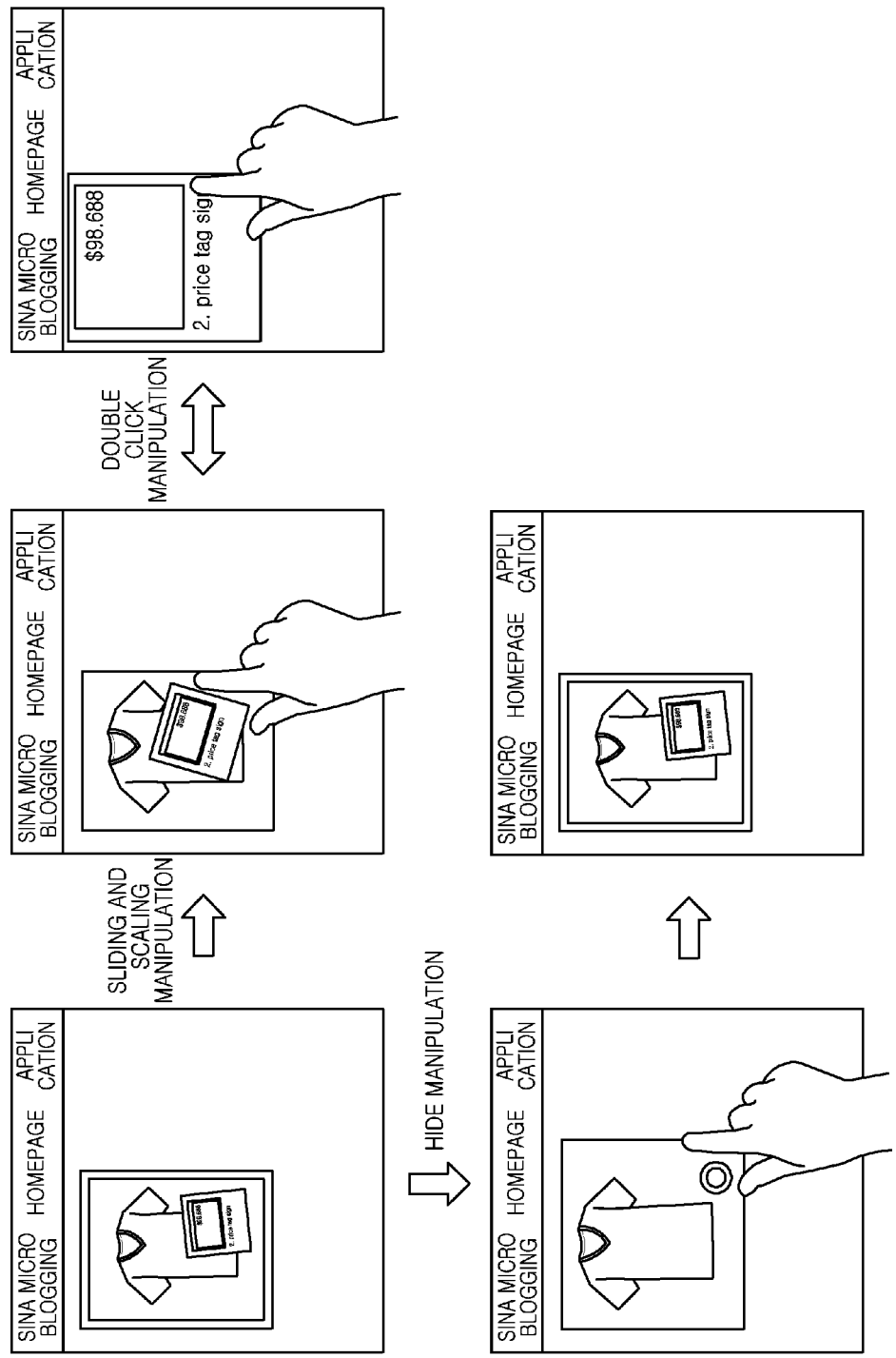

A. Operating steps that the user shares correlation image group are as follows:

1. As shown in FIG. 10A, selecting a correlation image group needed to be shared; clicking on a "share" button and selecting to share the correlation image group to "sina microblogging". (as an example, assuming that sina microblogging has used the image correlation method of the present invention);
2. As shown in FIG. 10B, display layout and effect of the correlated images shown in a microblogging client and operations of the correlated images are consistent with those of the user's particular machine; and
3. If the user selects to share the correlation image group to a friend, the user can directly share the correlation image group by selecting a phone number or QQ (instant messaging) number of the friend.

Figure 11A:
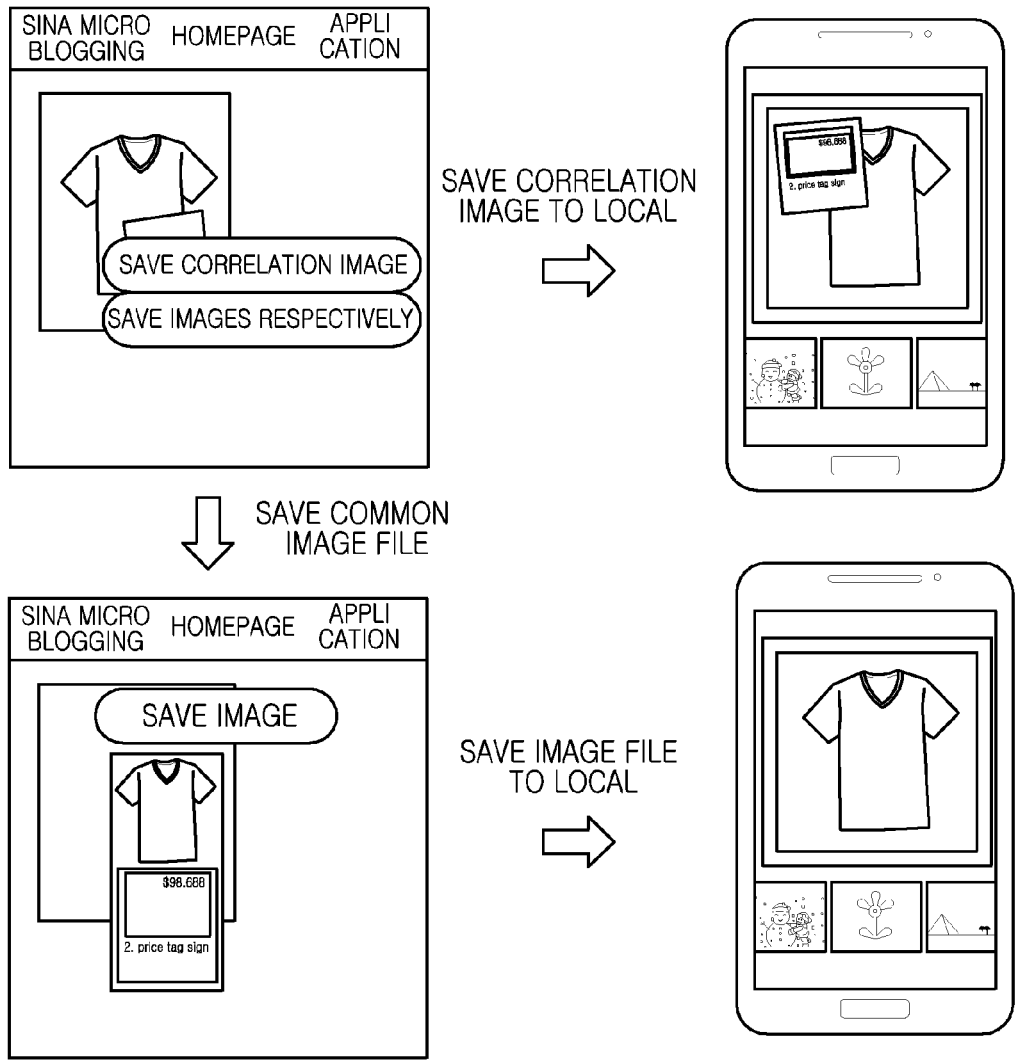
FIGS. 11A-11B illustrate operation of a peer end on the correlation image group according to an embodiment of the present invention.

B. Specific operations of the correlation image group are as follows:

The sharing peer can save the shared correlation image group from a social network client such as microblogging client. As shown in FIG. 11A, the user can select to directly save the correlation image group, and can also separately save a single image of the correlation image group.

When the user selects "save correlation image", the entire correlation image group including all correlated image files and the correlation configuration file containing four elements such as file information of correlated images, correlation identifiers, correlation display layout and effect of correlated images, and manipulation of correlated images, can be simultaneously saved in a local file system of the sharing peer.

When the user selects "save images respectively", the selected single image file can be saved in the local file system of the sharing peer.

Figure 11B:
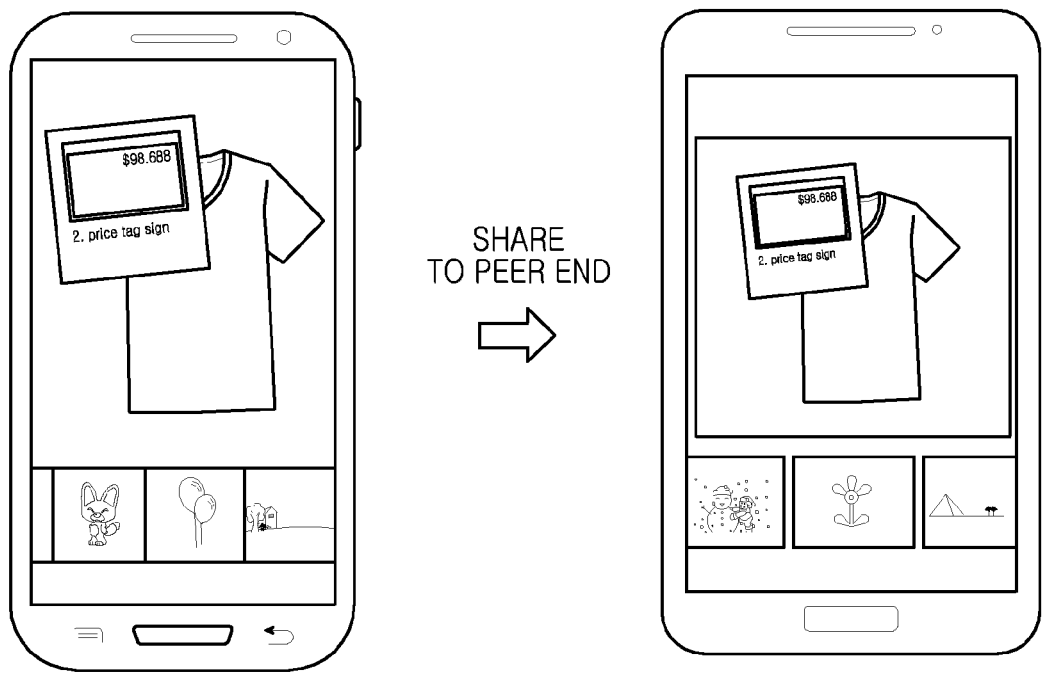

When the sharing peer supports the image correlation method of the present invention, the peer end device reads and parses information of the correlation configuration file to find corresponding class file picture resources, and performs combined displaying according to information of the configuration file. In this manner, the same display effect of the correlation image group as that of the sharing end can be seen, as shown in FIG. 11B.

When establishing a correlation image group in the sharing end, the correlation relationship stored in the correlation configuration can be described by using XML language, and saved in the form of HTML pages. In this manner, even if the sharing peer does not support the image correlation method of the present invention, a built-in HTML browser toolbar of the sharing peer device can be used to view combined display content after correlation, but the present invention is not limited to performing editing and saving operations on the correlation image group.

The above are examples of the image correlation method of the present invention. Through the above manners, using the stored correlation relationship to perform combined display of the various image class files of the correlation image group, a plurality of image specified by the user can be simultaneously displayed, which improves operational efficiency of the user to browse two or more images, and does not require an additional saving of a combined display image after correlation, which conserves system resources. In the combined displaying state, each image class file of the correlation image group can be operated separately, which increases operational flexibility.

Methods according to embodiments described in claims and/or a specification of the present invention may be implemented in a form of hardware, software, or a combination thereof.

When implemented with software, a computer readable storage medium that stores at least one program (software module) may be provided. At least one program stored at a computer readable storage medium is formed to execute by at least one processor within an electronic device. At least one program includes an instruction that enables the electronic device to execute methods according to embodiments described in claims and/or a specification of the present invention.

Such a program (software module, software) may be stored at a non-volatile memory including a Random Access Memory (RAM), a flash memory, a Read-Only Memory (ROM), an Electrically Erasable and Programmable ROM (EEPROM), a magnetic disk storage device, a Compact Disk ROM (CD-ROM), a Digital Versatile Disk (DVD), or an optical storage device of other form, and a magnetic cassette.

Alternatively, the program may be stored at a memory. Each constituent memory may be included in plural.

While the present invention has been particularly shown and described with reference to embodiments thereof, it will be understood by those skilled in the art that various changes in form and details may be made therein without departing from the spirit and scope of the present invention as defined by the appended claims.

What is claimed is:

1. A method in an electronic device, the method comprising:
   generating a correlation image group by establishing and saving a correlation relationship for a plurality of image class files;
   displaying combined image class files of the generated correlation image group on a same page according to the correlation relationship;
   receiving, in the combined display state, a user's operation instruction for any one image class file of the correlation image group; and
   separately performing a corresponding operation on the any one image class file according to the operation instruction,
   wherein the image class file includes at least one of an image and a correlation image group,
   wherein the correlation relationship is used to record file information and display position information of each image class file of the correlation image group,
   wherein the user's operation instruction for the any one image class file includes at least one of scaling and double click, and
   wherein, when the user's operation instruction for the any one image class file is the scaling operation, a display size of all images of the any one image class file is adjusted according to the operation instruction, and the current display size of a corresponding image class file that has been adjusted in the correlation relationship is stored, after confirmation by the user, or
   wherein, when the user's operation instruction for the any one image class file is the double click operation, the any one image class file is displayed in a maximized state, or the any one image class file that is restored to the display size stored in the correlation relationship is displayed.

2. The method of claim 1, further comprising:
   binding together all image class files of the correlation image group and corresponding correlation relationship;
   sharing all the image class files of the correlation image group and the corresponding correlation relationship which are bound together on the network with other terminal devices;
   obtaining, by a terminal device of a sharing peer, all the image class files of the correlation image group and the corresponding correlation relationship which are bound together for sharing;
   displaying, according to the correlation relationship, combined image class files of the correlation image group bound with the correlation relationship on the same page;
   receiving, in the terminal device of the sharing peer, in the combined display state, the user's operation instruction for any one image class file of the correlation image group; and
   separately performing the corresponding operation on the any one image class file according to the operation instruction.

3. The method of claim 1, further comprising, prior to establishing the correlation relationship for the plurality of image class files:
   setting in advance a correlation-shooting mode in a terminal device;
   determining whether to correlate a plurality of images taken by the terminal device, to correlate one image taken by the terminal device with other specified image class file; or according to the user's operation instruction, to correlate a plurality of image class files selected by the user in the terminal device; and
   recommending, by a correlation system, images to be correlated with an image specified by the user according to detection of image properties, selection, by the user, of images from the recommended images, and a result of each of the determinations.

4. The method of claim 3, wherein the recommending, by a correlation system, images to be correlated with an image specified by the user according to detection of image properties comprises:
   selecting and recommending, through image recognition technology, images having a same feature as the image specified by the user from the gallery; selecting and recommending, by comparing Global Positioning System (GPS) information of image files, images having GPS information that is consistent with GPS information of the image specified by the user from the gallery; and
   selecting and recommending, through comparing shooting time information of photo files, images from the gallery, wherein an interval between a shooting time of each recommended image and the image specified by the user is less than a set time threshold.

5. The method of claim 1, further comprising:
   receiving a deletion instruction from the user for any one image class file of the correlation image group;
   deleting file information and display position information of the any one image class file from the correlation relationship; and
   deleting the correlation relationship, after confirmation by the user, when the correlation relationship saves the file information and the display position information of only one image class file.

6. The method of claim 1, further comprising:
   receiving a changing instruction from the user for any one image class file of the correlation image group;
   deleting file information and display position information of the any one image class file from the correlation relationship; and
   adding file information and display position information of a changed image class file specified by the user into the correlation relationship.

7. The method of claim 1, wherein the display position information of each image class file stored in the correlation relationship is a customized correlation display layout that is a default display of a system or one of a plurality of preset display templates selected by the user, and includes display position, and indication of whether to hide and support operation types of each image class file, and
   wherein the displaying the combined image class files of the correlation image group includes displaying the combined image class files of the correlation image group according to the display layout.

8. The method of claim 1, wherein the correlation relationship stores a valid range of each image class file, and
   wherein receiving the user's operation instruction for any one image class file of the correlation image group includes using an operation instruction detected in a valid range corresponding to the any one image class file as the operation instruction of the any one image class file.

9. The method of claim 1, wherein when the any one image class file is a correlation image group, the separately performing the corresponding operation on the any one image class file according to the operation instruction includes performing, in the combined displaying state of the any one image class file, the corresponding operation on all images that are of the corresponding correlation image group.

10. The method of claim 1, wherein when the user's operation instruction for the any one image class file further includes position sliding, the any one image class file is displayed on an indicated position according to the operation instruction; after confirmation of the user and ending of the position sliding instruction, and the current position information of the any one image class file is stored in the correlation relationship.

11. The method of claim 1, wherein the correlation relationship stores a hide identifier corresponding to each image class file, and
wherein it is determined whether to display a corresponding image class file in the combined display state, according to the hide identifier corresponding to each image class file.

12. The method of claim 11, wherein when the user's operation instruction for the any one image class file further includes hiding,
the any one image class file is hidden according to the operation instruction,
the hide identifier corresponding to the corresponding image class file is recorded as hidden, after confirmation by the user,
the any one image class file is displayed according to the operation instruction, when the user's operation instruction for the any one image class file is displaying, and
the hide identifier corresponding to the corresponding image class file is recorded as a display, after confirmation by the user.

13. The method of claim 1, wherein the establishing and saving the correlation relationship for the plurality of image class files comprises:
establishing a correlation configuration file for a correlation image group to be formed, the correlation configuration file being used to store a number of image class files of the correlation image group to be formed, and establishing file information and display position information of each image class file after having been correlated, wherein when the image class file is a correlation image group, the file information of the image class file is a file name and path information of a configuration file of the corresponding correlation image group, and when the image class file is an image, the file information of the image class file is the file name and path information of the corresponding image; and
wherein the displaying combined image class files of the correlation image group on a same page according to the correlation relationship comprises determining a display position of each image class file of the correlation image group according to the display position information stored in the correlation configuration file, and determining display content of each image class file of the correlation image group according to the file information of the image class file stored in the correlation configuration file, and
wherein when the image class file is a correlation image group, the display content of the image class file is displayed combined with content of various image class files of the corresponding correlation image group.

14. The method of claim 13, wherein if the image class file includes a correlation image group, the correlation configuration file includes indication information that indicates each image class file as an image or a correlation image group.

15. The method of claim 1, wherein the user's operation instruction for the any one image class file further includes at least one of position sliding, hiding, and display.

16. An electronic device comprising:
a display; and
at least one processor operatively coupled to the display, the processor configured to:
generate a correlation image group by establishing and saving correlation relationship for a plurality of image class files;
display combined image class files of the generated correlation image group on a same page according to the correlation relationship;
receive, in the combined display state, a user's operation instruction for any one image class file of the correlation image group, and
separately perform a corresponding operation on the any one image class file according to the operation instruction,
wherein the image class file includes at least one of an image and a correlation image group,
wherein the correlation relationship is used to record file information and display position information of each image class file of the correlation image group,
wherein the user's operation instruction for the any one image class file includes at least one of scaling and double click by the processor, and
wherein, when the user's operation instruction for the any one image class file is the scaling operation, by the processor, the a display size of all images of the any one image class file is adjusted according to the operation instruction, and the current display size of a corresponding image class file that has been adjusted in the correlation relationship is stored, after confirmation by the user, or
wherein, when the user's operation instruction for the any one image class file is the double click operation, by the processor, the any one image class file is displayed in a maximized state, or the any one image class file that is restored to the display size stored in the correlation relationship is displayed.

17. The electronic device of claim 16, wherein all image class files of the correlation image group and corresponding correlation relationship information are bound together, and all the image class files of the correlation image group and the corresponding correlation relationship which are bound together are shared on a network with at least one other electronic device.

18. The electronic device of claim 16, wherein the user's operation instruction for the any one image class file further includes at least one of position sliding, hiding, and display.

19. A non-transitory computer-readable storage medium for storing one or more programs, performed by an electronic device, the one or more programs including instructions which allow the device to perform a method for operating the electronic device comprising:
generating a correlation image group by establishing and saving a correlation relationship for a plurality of image class files;

displaying combined image class files of the generated correlation image group on a same page according to the correlation relationship;

receiving, in the combined display state, a user's operation instruction for any one image class file of the correlation image group; and separately performing a corresponding operation on the any one image class file according to the operation instruction, wherein the image class file includes at least one of an image and a correlation image group, wherein the correlation relationship is used to record file information and display position information of each image class file of the correlation image group, wherein the user's operation instruction for the any one image class file includes at least one of scaling and double click, and wherein, when the user's operation instruction for the any one image class file is the scaling operation, a display size of all images of the any one image class file is adjusted according to the operation instruction, and the current display size of a corresponding image class file that has been adjusted in the correlation relationship is stored, after confirmation by the user, or wherein, when the user's operation instruction for the any one image class file is the double click operation, the any one image class file is displayed in a maximized state, or the any one image class file that is restored to the display size stored in the correlation relationship is displayed.

20. The method of claim 19, wherein the user's operation instruction for the any one image class file further includes at least one of position sliding, hiding, and display.

* * * * *